(12) United States Patent
Asano

(10) Patent No.: US 8,600,099 B2
(45) Date of Patent: Dec. 3, 2013

(54) METHOD OF DETECTING EMBEDDED DATA FROM IMAGE DATA HAVING A PLURALITY OF TYPES OF DATA EMBEDDED THEREIN

(75) Inventor: Motohiro Asano, Osaka (JP)

(73) Assignee: Konica Minolta Business Technologies, Inc. (JP)

( * ) Notice: Subject to any disclaimer, the term of this patent is extended or adjusted under 35 U.S.C. 154(b) by 1161 days.

(21) Appl. No.: 12/353,574

(22) Filed: Jan. 14, 2009

(65) Prior Publication Data

US 2009/0190796 A1    Jul. 30, 2009

(30) Foreign Application Priority Data

Jan. 25, 2008 (JP) ................................. 2008-015355

(51) Int. Cl.
*G06K 9/00* (2006.01)

(52) U.S. Cl.
USPC .......................................................... 382/100

(58) Field of Classification Search
USPC .......................................... 382/100, 232, 239
See application file for complete search history.

(56) References Cited

U.S. PATENT DOCUMENTS

| | | | | |
|---|---|---|---|---|
| 6,047,374 | A * | 4/2000 | Barton ............................ | 713/150 |
| 6,580,804 | B1 | 6/2003 | Abe ................................ | 382/100 |
| 6,993,148 | B1 * | 1/2006 | Miyashita et al. ............. | 382/100 |
| 7,280,701 | B2 * | 10/2007 | Moroo et al. .................. | 382/239 |
| 2004/0036924 | A1 * | 2/2004 | Ihara .............................. | 358/3.28 |
| 2004/0052401 | A1 * | 3/2004 | Suzaki ........................... | 382/100 |
| 2006/0181564 | A1 | 8/2006 | Asano ............................. | 347/19 |
| 2006/0262957 | A1 * | 11/2006 | Asano ............................. | 382/100 |
| 2007/0030521 | A1 * | 2/2007 | Fujii et al. ...................... | 358/3.28 |
| 2008/0253674 | A1 * | 10/2008 | Moroo et al. .................. | 382/239 |
| 2008/0292129 | A1 * | 11/2008 | Fan et al. ....................... | 382/100 |

FOREIGN PATENT DOCUMENTS

| | | | |
|---|---|---|---|
| JP | 11120015 A | * | 4/1999 |
| JP | 2000-59610 A | | 2/2000 |
| JP | 2007-96503 A | | 4/2007 |

OTHER PUBLICATIONS

U.S. Appl. No. 12/334,801, filed Dec. 15, 2008, Asano.

* cited by examiner

*Primary Examiner* — Wenpeng Chen
(74) *Attorney, Agent, or Firm* — Cantor Colburn LLP

(57) ABSTRACT

Data to be embedded is divided and thus embedded in areas internal to a block corresponding to a predetermined region of a scanned image. Of the areas, a defined area has the embedded data's identification information embedded therein. A detection apparatus includes a counter including a region including a region storing identification information and a region storing a count value corresponding to embedded data divided that is detected in an area other than the defined area, and classifies a count value corresponding to embedded data divided that is detected from a scanned image for each identification information detected in the block, and stores it to the counter. The detection apparatus identifies data stored for each identification information that has the largest count value for each area as data embedded in that area, and reconstructs the embedded data.

22 Claims, 28 Drawing Sheets

FIG. 7

|  | DATA TO BE EMBEDDED (5 BITS/1 PATTERN) | |
|---|---|---|
|  | BINARY | DECIMAL |
| 1ST PATTERN | 01110 | 14 |
| 2ND PATTERN | 10100 | 20 |
| 3RD PATTERN | 11110 | 30 |
| 4TH PATTERN | 00101 | 5 |
| 5TH PATTERN | 10000 | 16 |
| 6TH PATTERN | 00000 | 0 |
| 7TH PATTERN | 01001 | 9 |
| 8TH PATTERN | 10111 | 23 |
| 9TH PATTERN | 00010 | 2 |
| 10TH PATTERN | 10001 | 17 |
| 11TH PATTERN | 11010 | 26 |
| 12TH PATTERN | 11111 | 31 |
| 13TH PATTERN | 11000 | 24 |
| 14TH PATTERN | 00101 | 5 |
| 15TH PATTERN | 10001 | 17 |
| 16TH PATTERN | 00111 | 7 |
| 17TH PATTERN | 00001 | 1 |
| 18TH PATTERN | 01011 | 11 |
| 19TH PATTERN | 11101 | 29 |
| 20TH PATTERN | 01101 | 13 |
| 21ST PATTERN | 10010 | 18 |
| 22ND PATTERN | 01111 | 15 |
| TOTAL | 0101001101 | 333 |
| LOWEST 10 BITS (ID INFO) | 0101001101 UPPER 5 BITS LOWER 5 BITS | 10 13 |

FIG. 8

| 1ST PATTERN (14) | 2ND PATTERN (20) | 3RD PATTERN (30) | 4TH PATTERN (5) | 5TH PATTERN (16) |
|---|---|---|---|---|
| 6TH PATTERN (0) | 7TH PATTERN (90) | 8TH PATTERN (23) | 9TH PATTERN (2) | 10TH PATTERN (17) |
| 11TH PATTERN (26) | 12TH PATTERN (31) | POSITIONING, PARTICULAR PATTERN | 13TH PATTERN (24) | 14TH PATTERN (5) |
| 15TH PATTERN (17) | 16TH PATTERN (7) | 17TH PATTERN (1) | 18TH PATTERN (11) | 19TH PATTERN (29) |
| 20TH PATTERN (13) | 21ST PATTERN (18) | 22ND PATTERN (15) | ID INFO UPPER 5 BITS (10) | ID INFO LOWER 5 BITS (13) |

FIG. 10

[abcd efgh]

| DATA | DOT POSITION |
|---|---|
| 0 | 0000 0111 |
| 1 | 0000 1011 |
| 2 | 0001 0011 |
| 3 | 0010 0011 |
| 4 | 0100 0011 |
| 5 | 1000 0011 |
| 6 | 0000 1101 |
| 7 | 0001 0101 |
| 8 | 0010 0101 |
| 9 | 0100 0101 |
| 10 | 1000 0101 |
| 11 | 0001 1001 |
| 12 | 0010 1001 |
| 13 | 0100 1001 |
| 14 | 1000 1001 |
| 15 | 0011 0001 |
| 16 | 0101 0001 |
| 17 | 1001 0001 |
| 18 | 0110 0001 |
| 19 | 1010 0001 |
| 20 | 1100 0001 |
| 21 | 0000 1110 |
| 22 | 0001 0110 |
| 23 | 0010 0110 |
| 24 | 0100 0110 |
| 25 | 1000 0110 |
| 26 | 0001 1010 |
| 27 | 0010 1010 |
| 28 | 0100 1010 |
| 29 | 1000 1010 |
| 30 | 0011 0010 |
| 31 | 0101 0010 |
| PARTICULAR PATTERN | 1001 0010 |
| | |

FIG. 14

|  | DATA TO BE EMBEDDED (5 BITS/1 PATTERN) | |
|---|---|---|
|  | BINARY | DECIMAL |
| 1ST PATTERN | 00111 | 7 |
| 2ND PATTERN | 00000 | 0 |
| 3RD PATTERN | 10101 | 21 |
| 4TH PATTERN | 10011 | 19 |
| 5TH PATTERN | 01011 | 11 |
| 6TH PATTERN | 11111 | 31 |
| 7TH PATTERN | 01101 | 13 |
| 8TH PATTERN | 01111 | 15 |
| 9TH PATTERN | 00010 | 2 |
| 10TH PATTERN | 10001 | 5 |
| 11TH PATTERN | 00101 | 26 |
| 12TH PATTERN | 00111 | 7 |
| 13TH PATTERN | 11101 | 29 |
| 14TH PATTERN | 00010 | 2 |
| 15TH PATTERN | 10001 | 17 |
| 16TH PATTERN | 01110 | 14 |
| 17TH PATTERN | 01010 | 10 |
| 18TH PATTERN | 01000 | 16 |
| 19TH PATTERN | 10111 | 23 |
| 20TH PATTERN | 11011 | 27 |
| 21ST PATTERN | 11100 | 28 |
| 22ND PATTERN | 00110 | 6 |
| TOTAL | 0101001001 | 329 |
| LOWEST 10 BITS (ID INFO) | 0101001001 UPPER 5 BITS LOWER 5 BITS | 10 9 |

POSITIONING DOT
PARTICULAR PATTERN

FIG. 19

| ID INFO | HOW MANY TIMES INPUT IS DONE | FLAG | | | | | | | | |
|---|---|---|---|---|---|---|---|---|---|---|
| 0000000000 | 0 | 0 | | | | | | | | |
| | DATA 0 | DATA 1 | DATA 2 | DATA 3 | DATA 4 | DATA 5 | ... | DATA 30 | DATA 31 |
| 1ST PATTERN | 0 | 0 | 0 | 0 | 0 | 0 | | 0 | 0 |
| 2ND PATTERN | 0 | 0 | 0 | 0 | 0 | 0 | | 0 | 0 |
| 3RD PATTERN | 0 | 0 | 0 | 0 | 0 | 0 | | 0 | 0 |
| 4TH PATTERN | 0 | 0 | 0 | 0 | 0 | 0 | | 0 | 0 |
| ... | | | | | | | | | |
| 22ND PATTERN | 0 | 0 | 0 | 0 | 0 | 0 | | 0 | 0 |

501: ID INFO column
503: DATA columns

FIG. 21

| ID INFO | 0101001101 | | HOW MANY TIMES INPUT IS DONE | | 12698 | | FLAG | | 1 | |
|---|---|---|---|---|---|---|---|---|---|---|
| | DATA 0 | DATA 1 | DATA 2 | DATA 3 | DATA 4 | DATA 5 | ... | DATA 30 | DATA 31 |
| 1ST PATTERN | 0 | 0 | 0 | 1 | 0 | 0 | | 0 | 0 |
| 2ND PATTERN | 0 | 0 | 0 | 0 | 0 | 0 | | 9863 | 0 |
| 3RD PATTERN | 0 | 0 | 2 | 0 | 0 | 8759 | | 0 | 0 |
| 4TH PATTERN | 1 | 0 | 0 | 5 | 0 | 0 | | 0 | 0 |
| ... | | | | | | | | | |
| 22ND PATTERN | 0 | | | 0 | 0 | 0 | | 0 | 3 |

FIG. 22

| ID INFO | 0101001001 | HOW MANY TIMES INPUT IS DONE | | | | 13567 | | FLAG | | 1 |
|---|---|---|---|---|---|---|---|---|---|---|
| | DATA 0 | DATA 1 | DATA 2 | DATA 3 | DATA 4 | DATA 5 | ... | DATA 30 | DATA 31 |
| 1ST PATTERN | 0 | 0 | 0 | 0 | 4 | 0 | | 0 | 0 |
| 2ND PATTERN | (10267) | 0 | 0 | 0 | 0 | 0 | | 0 | 1 |
| 3RD PATTERN | 0 | 0 | 0 | 3 | 0 | 0 | | 0 | 0 |
| 4TH PATTERN | 0 | 0 | 0 | 0 | 0 | 0 | | 0 | 0 |
| ... | | | | | | | | | |
| 22ND PATTERN | 0 | 2 | 0 | 0 | 0 | 0 | | 0 | 0 |

FIG. 26

| ID INFO | 0100001101 | | HOW MANY TIMES INPUT IS DONE | | 1 | | | FLAG | 1 | |
|---|---|---|---|---|---|---|---|---|---|---|
| | DATA 0 | DATA 1 | DATA 2 | DATA 3 | DATA 4 | DATA 5 | ... | | DATA 30 | DATA 31 |
| 1ST PATTERN | 0 | 0 | 0 | 0 | 1 | 0 | | | 0 | 0 |
| 2ND PATTERN | 0 | 0 | 0 | 0 | 0 | 0 | | | 0 | 0 |
| 3RD PATTERN | 0 | 0 | 0 | 0 | 0 | 1 | | | 0 | 0 |
| 4TH PATTERN | 0 | 0 | 0 | 0 | 0 | 0 | | | 0 | 0 |
| ... | | | | | | | | | | |
| 22ND PATTERN | 0 | 0 | 0 | 0 | 0 | 0 | | | 0 | 0 |

FIG. 28

| | DATA 0 | DATA 1 | DATA 2 | DATA 3 | DATA 4 | DATA 5 | ... | DATA 30 | DATA 31 |
|---|---|---|---|---|---|---|---|---|---|
| 1ST PATTERN | 0 | 0 | 0 | 0 | 0 | 0 | | 0 | 0 |
| 2ND PATTERN | 0 | 0 | 0 | 0 | 0 | 0 | | 0 | 0 |
| 3RD PATTERN | 0 | 0 | 0 | 0 | 0 | 0 | | 0 | 0 |
| 4TH PATTERN | 0 | 0 | 0 | 0 | 0 | 0 | | 0 | |
| ... | | | | | | | | | |
| 22ND PATTERN | 0 | 0 | 0 | 0 | 0 | 0 | | 0 | 0 |
| UPPER 5 BITS OF ID INFO | 0 | 0 | 0 | 0 | 0 | 0 | | 0 | 0 |
| LOWER 5 BITS OF ID INFO | 0 | 0 | 0 | 0 | 0 | 0 | | 0 | 0 |

| | | | | | | | | | | |
|---|---|---|---|---|---|---|---|---|---|---|
| FOR CLASSIFICATION TYPE 1 | ID INFO | 0101001101 | | | HOW MANY TIMES INPUT IS DONE | 2367 | | | FLAG | 1 |
| FOR CLASSIFICATION TYPE 2 | ID INFO | 0101001001 | | | HOW MANY TIMES INPUT IS DONE | 2165 | | | FLAG | 1 |
| | | DATA 0 | DATA 1 | DATA 2 | DATA 3 | DATA 4 | DATA 5 | ... | DATA 30 | DATA 31 |
| 1ST PATTERN | CLASSIFICATION TYPE 1 | 0 | 0 | 1 | 0 | 0 | 0 | | 2004 | 0 |
| | CLASSIFICATION TYPE 2 | 0 | 0 | 0 | 0 | 0 | 0 | | 0 | 0 |
| | NON CLASSIFICATION TYPE | 0 | 0 | 1 | 1 | 0 | 0 | | 2034 | 0 |
| 2ND PATTERN | CLASSIFICATION TYPE 1 | | | | | 0 | 1967 | | 0 | |
| ... | | | | | | | | | | |

FIG. 30

| ID INFO | 01010011101 | | | HOW MANY TIMES INPUT IS DONE | 2367 | | | FLAG | 1 |
|---|---|---|---|---|---|---|---|---|---|
| | INFO DOT a | INFO DOT b | INFO DOT c | INFO DOT d | INFO DOT e | INFO DOT f | INFO DOT g | INFO DOT h | |
| 1ST PATTERN | 0 | 11 | 30 | 0 | 0 | 2157 | 2068 | 2155 | |
| 2ND PATTERN | 1987 | 2170 | 0 | 0 | 0 | 2 | 0 | 1998 | |
| 3RD PATTERN | 0 | 0 | 2014 | 2058 | 0 | 0 | 2034 | 0 | |
| 4TH PATTERN | 1910 | 0 | 0 | 1 | 0 | 0 | 1967 | 1869 | |
| ... | | | | | | | | | |
| 22ND PATTERN | 1 | 0 | 1954 | 2003 | 0 | 0 | 0 | 1941 | |

METHOD OF DETECTING EMBEDDED DATA FROM IMAGE DATA HAVING A PLURALITY OF TYPES OF DATA EMBEDDED THEREIN

This application is based on Japanese Patent Application No. 2008-015355 filed with the Japan Patent Office on Jan. 25, 2008, the entire content of which is hereby incorporated by reference.

BACKGROUND OF THE INVENTION

1. Field of the Invention

The present invention relates generally to detection methods and apparatuses and particularly to detection methods and apparatuses detecting embedded data from image data.

2. Description of the Related Art

There is known a technique used to detect embedded data from an image having data indicating a copyright holder or the like embedded therein in a background of an original image of characters or the like in the form of a woven pattern.

A technique used to detect embedded data is disclosed for example in Japanese Laid-Open Patent Publication No. 2000-059610. More specifically, an image is scanned to obtain image data, which is in turn divided into rectangles of a predetermined size and therefrom embedded bit data is extracted and if an extracted bit string satisfies a condition added in embedding the data for determining a rectangle's position, the bit string is handled as a candidate result of decoding, and if there are more than one such candidates, majority logic is performed for each bit to adopt a more reliable bit value as a result of decoding.

Furthermore, an earlier patent application filed by the Applicant and published as Japanese Laid-Open Patent Publication No. 2007-096503 discloses that to achieve an increased processing speed, image data obtained from a scanned image is divided into a plurality of blocks and therefrom local data is extracted and whether information can accurately be read for each predetermined number of blocks is determined, and if so, the information is read.

However, these documents disclose techniques assuming detecting one type of data embedded in an original of a single sheet. If an original of a single sheet having a plurality of types of data embedded therein or two or more originals each having different data embedded therein have their embedded data detected, the detection provides a result indicating each data mixed up, and the embedded data cannot be detected accurately.

SUMMARY OF THE INVENTION

The present invention has been made to overcome such disadvantage, and it contemplates a detection method and apparatus capable of detecting embedded data from image data having a plurality of types of data embedded therein.

To achieve the above object, the present invention in one aspect provides a method of detecting embedded data embedded in image data, the embedded data including identification information unique to the embedded data, and the embedded data being divided into a plurality of divided data each corresponding to a data value, the divided data being respectively embedded in a plurality of blocks of the image data, the method comprising the steps of identifying each one of the blocks of the image data; detecting the identification information in the blocks; extracting the divided data from each block; counting the number of extractions of the divided data for each identification information; and reconstructing embedded data that is identified by the identification information based on the counted number of extractions.

The present invention in another aspect provides a detection apparatus for detecting embedded data embedded in image data, the embedded data including identification information unique to the embedded data, and the embedded data being divided into a plurality of divided data each corresponding to a data value, the divided data being respectively embedded in a plurality of blocks of the image data, the detection apparatus comprising: an identifying unit which is adapted to identify each one of the blocks of the image data; a detection unit which is adapted to detect the identification information in the blocks; an extraction unit which is adapted to extract the divided data from each block; a first counter which is adapted to count the number of extractions of the divided data for each identification information; and a reconstruction unit which is adapted to reconstruct embedded data that is identified by the identification information based on the number of extractions counted by the first counter.

The present invention thus allows a plurality of types of embedded data to be detected from image data having the plurality of types of data embedded therein.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram for illustrating a specific example of data to be embedded, and how the data to be embedded is divided.

FIG. 8 is a diagram for illustrating how data to be embedded is arranged.

FIG. 10 shows a specific example of an associative relationship between data to be embedded and an information pattern.

FIG. 14 shows a specific example of data to be embedded.

FIG. 19 shows a counter in configuration in a specific example.

FIG. 21 and FIG. 22 show a count value of a counter in a specific example.

FIG. 26 shows a count value of a counter in a specific example.

FIG. 28 to FIG. 30 show a counter in configuration in a specific example.

DESCRIPTION OF THE PREFERRED EMBODIMENTS

Figure 1:
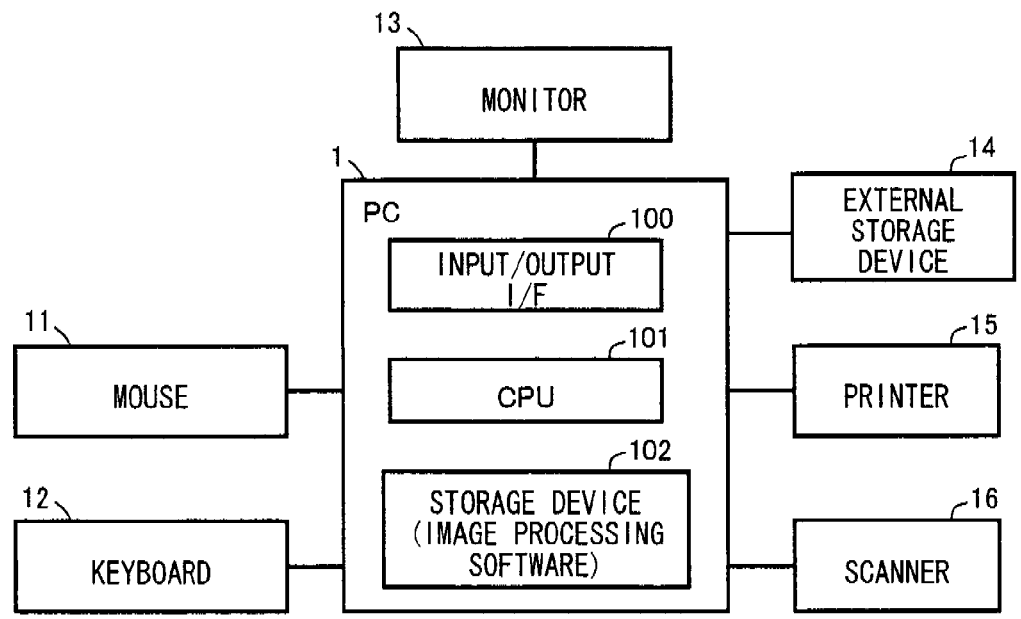
FIG. 1 shows a specific example of a concept in configuration of a personal computer (PC) and its peripheral equipment according to an embodiment.

Hereinafter reference will be made to the drawings to describe the present invention in embodiments. In the following description, identical parts and components are denoted by identical reference characters. Their names and functions are also identical.

In the present embodiment the present detection apparatus and an image formation apparatus generating image data to be processed in the detection apparatus will be described as that implemented in a personal computer (PC).

As a precondition for describing the present detection apparatus, how image data to be processed in the detection apparatus is generated and an image formation apparatus generating the image data will be described.

FIG. 1 shows a specific example of a concept in configuration of a PC 1 and its peripheral equipment that function as the above image formation apparatus according to the present embodiment. With reference to FIG. 1, PC 1 is connected to an operation input unit such as a mouse 11 and a keyboard 12, an image output unit such as a monitor 13 and a printer 15, an image reading unit such as a scanner 16, and one of storage unit such as an external storage device 14. PC 1 internally includes an input/output interface (I/F) 100 to communicate information with the connected peripheral equipment. Furthermore, PC 1 internally includes a processing unit such as a central processing unit (CPU) 101, and one of storage units such as a storage device 102. Storage device 102 has image processing software stored therein and CPU 101 reads and executes the image processing software to allow PC 1 to function as the above image formation apparatus.

Figure 2:
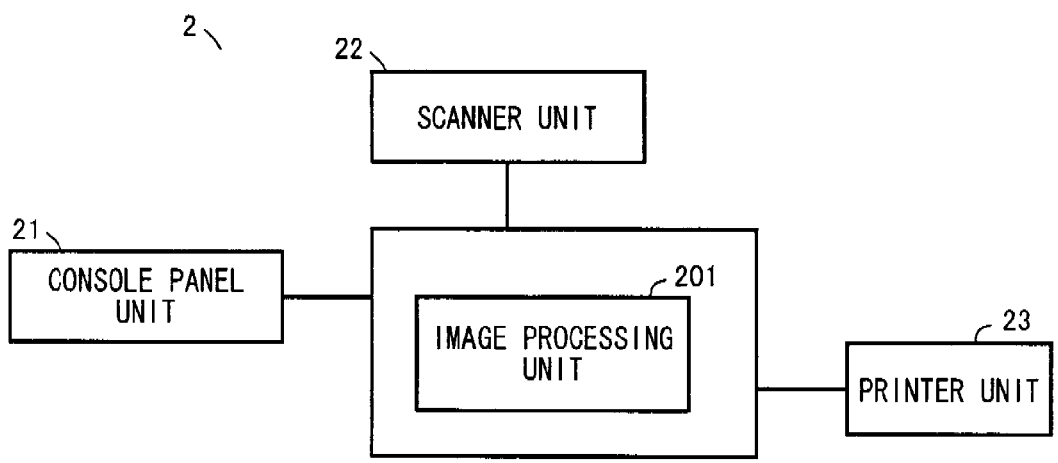
FIG. 2 shows a specific example of a concept in configuration of a multi function peripheral (MFP) functioning as an image formation apparatus and its peripheral equipment.

The image formation apparatus may not be implemented by a PC and may be another apparatus. Representatively, it is multi function peripheral (MFP) or a similar image formation apparatus. FIG. 2 shows a specific example of a concept in configuration of an MFP 2 functioning as the image formation apparatus when as another example the image formation apparatus is implemented by the MFP. With reference to FIG. 2, MFP 2 includes an operation input unit such as a console panel unit 21, an image reading unit such as a scanner unit 22, and an image output unit such as a printer unit 23. Furthermore, MFP 2 internally includes an image processing unit 201. Image processing unit 201 performs a process to allow MFP 2 to function as the image formation apparatus.

Figure 3:
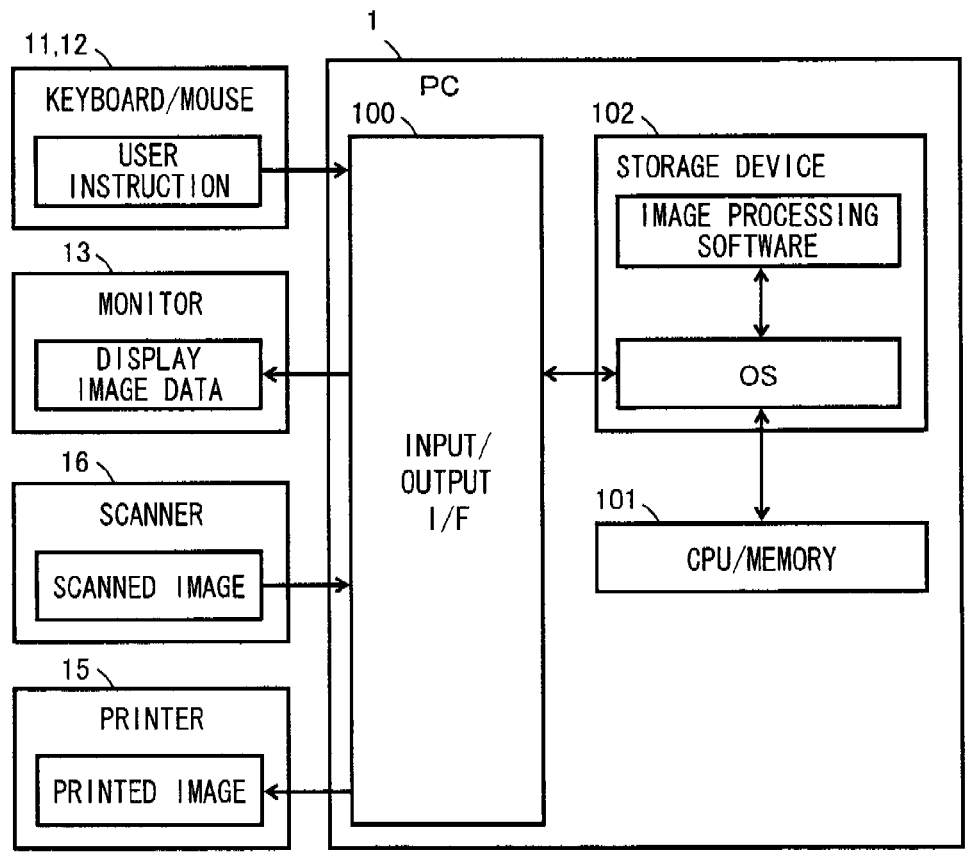
FIG. 3 is a block diagram showing a specific example of a hardware configuration of a PC and its function according to an embodiment.

FIG. 3 is a block diagram showing a specific example of a hardware configuration of PC 1 and its function in the present embodiment. With reference to FIG. 3, PC 1 internally includes input/output I/F 100, CPU 101, and storage device 102, as has been described previously.

Input/output I/F 100 is connected to mouse 11 and keyboard 12 to receive a user instruction input via mouse 11 and/or keyboard 12. Furthermore, input/output I/F 100 is connected to monitor 13 to pass monitor 13 data of an image to be displayed. Furthermore, input/output I/F 100 is connected to scanner 16 to receive an image (or data) scanned by scanner 16 and thus obtained. Furthermore, input/output I/F 100 is connected to printer 15 to pass printer 15 data of an image to be printed.

Storage device 102 has stored therein the aforementioned image processing software and operation software. These pieces of software may at least partially be stored in external storage device 14. CPU 101 internally includes memory, and reads software from storage device 102 and loads the software into the internal memory and therewhile executes the software. In doing so, CPU 101 uses data received through input/output I/F 100 and outputs via input/output I/F 100 to another apparatus the data generated through a process.

CPU 101 executes the image processing software stored in storage device 102 to implement an image formation apparatus, which embeds received data in image data obtained by scanner 16 reading an original image, image data generated by executing application software internal to PC 1 (e.g., document data generated by executing document forming software), and the like. CPU 101 embeds the received data in the image data in the form of a watermarking image of a woven pattern configured by a predetermined dot pattern. Furthermore, CPU 101 also extracts a woven pattern from image data obtained by scanning a thus generated image and reconstructs embedded original data.

In the following description, an image before having a woven pattern embedded therein will be referred to as an "original image". Data indicating information that is embedded in an original image will be referred to as "data to be embedded"/"embedded data". Data that is generated from data to be embedded and configures a watermarking image to be synthesized with an original image will be referred to as "watermarking (image) data". Data to be embedded is embedded in an original image in the form of a woven pattern represented by a dot configuring watermarking data. Of dots configuring a watermarking image, a dot used to represent data to be embedded will be referred to as an "information dot". A pattern that is configured of an information dot and associated with data to be embedded will be referred to as "information pattern".

Figure 4:
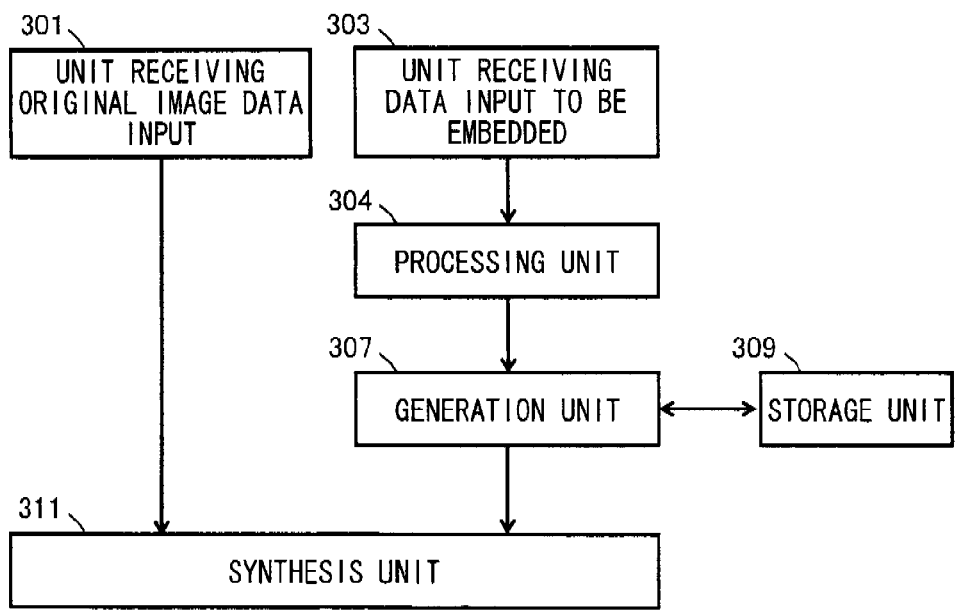
FIG. 4 is a block diagram showing a specific example of a configuration in function of a PC according to an embodiment.

FIG. 4 is a block diagram showing a specific example of a configuration in function of PC 1 in embedding data to be embedded in an original image. FIG. 4 shows functions, which are configured in CPU 101 mainly by CPU 101 executing the image processing software stored in storage device 102. Furthermore, they may be implemented by employing the FIG. 2 hardware configuration.

With reference to FIG. 4, PC 1's above functions include a unit 301 receiving original image data input, a unit 303 receiving data input to be embedded, a processing unit 304, a generation unit 307, a storage unit 309, and a synthesis unit 311.

Unit 301 receiving original image data input receives original image data input through input/output I/F 100 as scanner 16 scans an original image. Furthermore, when for example application software stored in PC 1 at storage device 102 is executed, unit 301 receiving original image data input obtains image data generated as the application software is executed. Unit 301 receiving original image data input is connected to synthesis unit 311 and outputs received original image data to synthesis unit 311.

Unit 303 receiving data input to be embedded receives data to be embedded that is input through input/output I/F 100 as mouse 11, keyboard 12 and/or the like are operated. Unit 303 receiving data input to be embedded is connected to generation unit 307 and outputs to generation unit 307 the data to be embedded that is received. Storage unit 309 has an associative relationship between data to be embedded and an information pattern stored therein. Generation unit 307 is connected to storage unit 309 and in accordance with the associative relationship identifies an information pattern from the data to be embedded that is received. In accordance with the identified information pattern, whether an information dot should be arranged at each defined position, which will be described hereinafter, is determined. Furthermore, whether a dot should also be arranged for another defined position is also determined. Furthermore, generation unit 307 is also connected to synthesis unit 311 and outputs to synthesis unit 311 watermarking data configured of the presence/absence of a dot for a defined position. Synthesis unit 311 performs a process for synthesizing the original image data received from unit 301 receiving original image data input and the watermarking data received from generation unit 307, i.e., a process for embedding an information pattern in an original image, and outputs image data thus obtained.

Figure 5:
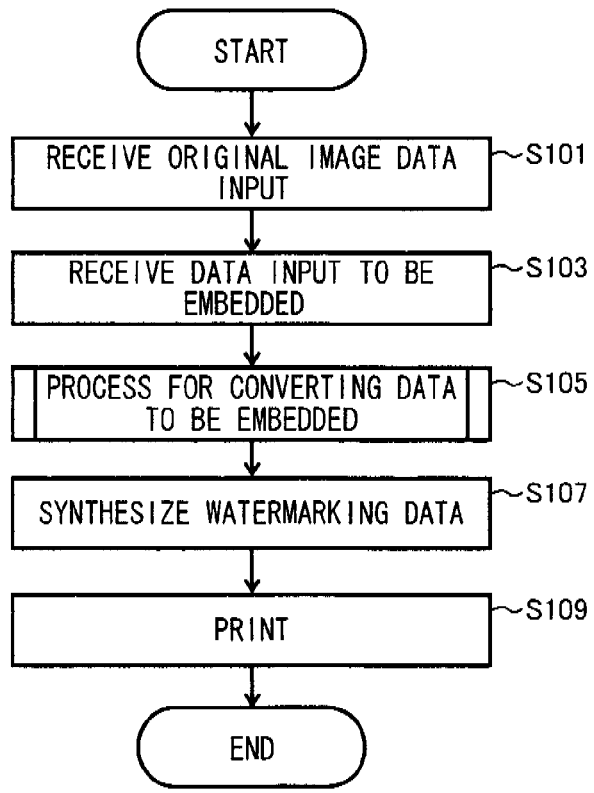
FIG. 5 is a flowchart of a specific example of a process performed in a PC according to an embodiment to embed data to be embedded in an original image.

FIG. 5 is a flowchart of a specific example of a process performed in PC 1 to embed data to be embedded in an original image. The FIG. 5 process is implemented by CPU 101 executing the image processing software stored in storage device 102.

With reference to FIG. 5, initially the PC 1 unit 301 receiving original image data input receives original image data input obtained through scanner 16 scanning an original image (step S101). Alternatively, it obtains image data generated by executing application software or the like internal to PC 1. Then, unit 303 receiving data input to be embedded receives data input through mouse 11, keyboard 12 and/or the like to be embedded (step S103).

Then, generation unit 307 performs a process for converting the data that is received in step S103 to be embedded to generate watermarking data (step S105), and synthesis unit 311 synthesizes the original image data received in step S101 and the watermarking data generated in step S105 together to generate data of an image to be printed (step S107). The generated image data is transmitted through input/output I/F 100 to printer 15 together with a print control signal and printed by printer 15 (step S109).

Figure 6:
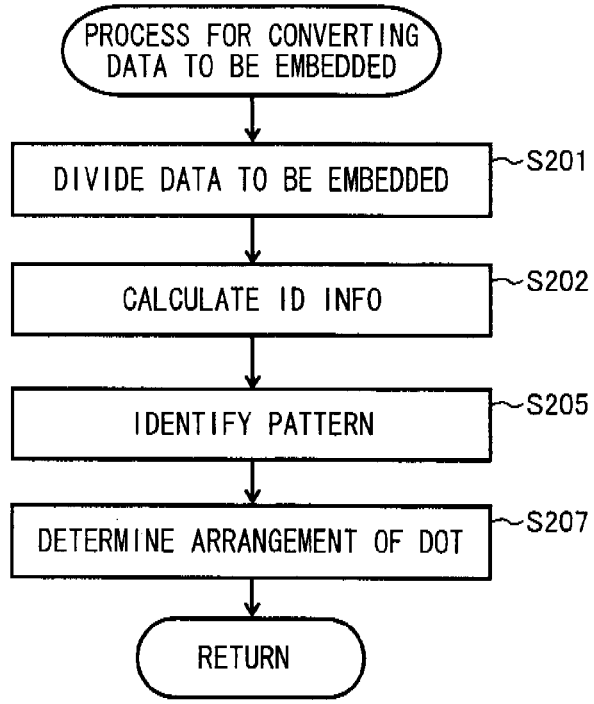
FIG. 6 is a flowchart representing a specific example of a process performed to convert data to be embedded to generate watermarking data.

Step S105 is performed, as will be described hereinafter with reference to the FIG. 6 flowchart. Initially, generation unit 307 divides the data that is received in step S103 to be embedded to have a predetermined size (step S201), and uses each divided data to generate identification information for the data received in step S103 to be embedded (step S202). Generation unit 307 identifies a pattern for each area (step S205), and determines in accordance with the identified pattern whether a dot is present or absent for a defined pixel position (step S207). By the presence/absence of a dot for each pixel position, as determined in step S207, watermarking image data is configured.

The above process allows an image to be printed that is an original image having data received to be embedded therein as a watermarking image.

In step S105, data to be embedded is converted to generate watermarking data through a process, as will be described hereinafter more specifically with reference to a specific example.

Initially, in step S201, it is assumed that the data received in step S103 to be embedded, which has 110 bits as one unit, is divided by 5 bits into 22, as shown in FIG. 7. As shown in FIG. 7 at the bottom, generation unit 307 adds together data divided by 5 bits into 22, and the processing result has the lowest 10 bits divided into upper 5 bits and lower 5 bits, and the upper 5 bits are provided as identification information for the data received in step S103 to be embedded and so are the lower 5 bits. In the FIG. 7 example, data divided by 5 bits in 22 are added together and a processing result of "0101001101" is obtained, and of its lowest 10 bits of "0101001101" the upper 5 bits of "01010" and the lower 5 bits of "01101" are provided as identification information. In step S202, identification information may be obtained in processing unit 304 in a method other than the above described method. For example, a processing substituting divided data in a previously defined, predetermined processing expression may be used to obtain identification information. The predetermined processing expression includes e.g., a processing expression including shifting, exclusive or (EXOR) and the like combined together, referred to as a cyclic redundancy check (CRC) generator polynomial. Furthermore, it is not limited to a processing operation using divided data, and for example defined data (e.g., numerals in order from 0) may be assigned in an order of inputs in step S103 to obtain identification information.

In step S205 generation unit 307 handles the data to be embedded that is divided in step S201 and the two items of identification information obtained in step S202 as data to be embedded, and refers to data to be embedded that is divided for each area configuring image data, as shown in FIG. 8, to identify a dot pattern corresponding to that data. More specifically, as shown in FIG. 8, each area is arranged to configure a single block, and the block is repeated to configure image data. In FIG. 8, a single block is configured of 5 rows of areas and 5 columns of areas for a total of 25 areas. A single block has a center area, which is defined as an area assumed by a particular pattern serving as a positioning pattern. The remaining 24 areas are defined to have arranged therein, in an order as defined, dot patterns corresponding to the data to be embedded that has been divided in 24. Note that the particular pattern may not be arranged in the center area of the block: it may be arranged in any area thereof. In the following description, data having a predetermined size, as shown in FIG. 8, and repeated to configure image data will be referred to as a "block", and 25 data in a matrix and configuring a single block will each be referred to as an "area".

Figure 9:
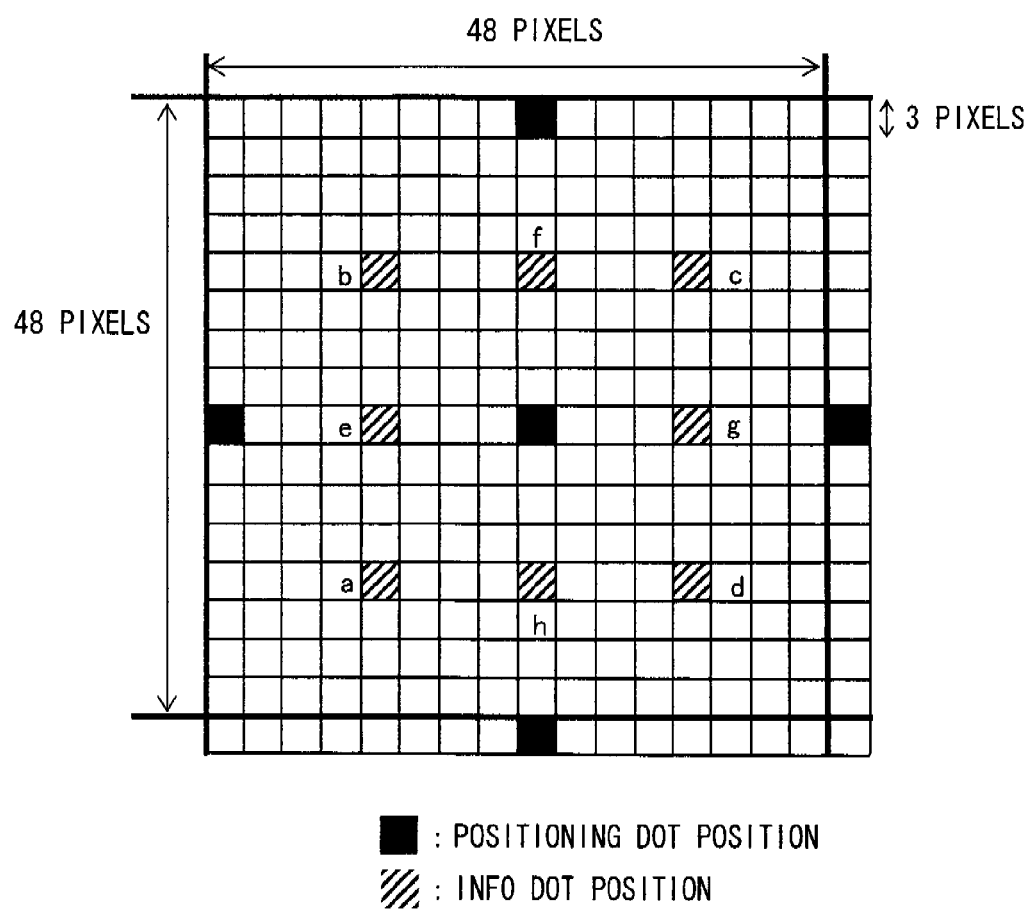
FIG. 9 is a diagram for illustrating a specific example of a configuration of a dot position in a single area.

FIG. 9 is a diagram for illustrating a specific example of a configuration of a dot position in a single area. In FIG. 9, original image data has a resolution of 600 dpi and an area has a size of a matrix of 48 by 48 pixels. Furthermore, herein, a single point dot is formed of a matrix of 3 by 3 pixels forming a rectangle (or square).

In the present embodiment, the positions in a single area that are assumed by a matrix of 3 by 3 pixels located at the center of the area, a matrix of 3 by 3 pixels located on a side that is formed of the uppermost 3 rows of pixels at a center as seen in the horizontal direction, and a matrix of 3 by 3 pixels located on a side that is formed of the leftmost 3 columns of pixels at a center as seen in the vertical direction, are used as positioning dot positions. In the FIG. 9 example, they correspond to a position represented by 25th to 27th pixels counted from the area's left end rightward and 25th to 27th pixels counted from the upper end downward, a position represented by 25th to 27th pixels counted from the left end rightward and 1st to 3rd pixels counted from the upper end downward, and a position represented by 1st to 3rd pixels counted from the left end rightward and 25th to 27th pixels counted from the upper end downward. These positioning dot positions are assumed by a positioning dot or a point dot. A positioning dot is a point dot provided to serve as a reference position to determine a position of a single area for embedding data to be embedded, and in each area it is unfailingly arranged at a positioning dot position. Alternatively, it may be unfailingly arranged at a positioning dot position in each area except an area that is to be assumed by the particular pattern.

Furthermore in the present embodiment there is provided in a single area a squire that has its center at a position of a matrix of 3 by 3 pixels located in the area at the center thereof and has each side having a length half that of one side of the area, and a position of a matrix of 3 by 3 pixels located at the center of each side of the square that is equidistant from the center position of the square, as seen upward and downward and rightward and leftward, and a position of a matrix of 3 by 3 pixels corresponding to each vertex of the square are used as information dot positions. In the FIG. 9 example, they correspond to a position represented by 13th to 15th pixels counted from the area's left end rightward and 25th to 27th pixels counted from the area's upper end downward, a position represented by 37th to 39th pixels counted from the left end rightward and 25th to 27th pixels counted from the upper end downward, a position represented by 25th to 27th pixels counted from the left end rightward and 13th to 15th pixels counted from the upper end downward, a position represented by 25th to 27th pixels counted from the left end rightward and 37th to 39th pixels counted from the upper end downward, a position represented by 13th to 15th pixels counted from the left end rightward and 37th to 39th pixels counted from the upper end downward, a position represented by 13th to 15th pixels counted from the left end rightward and 13th to 15th pixels counted from the upper end downward, a position represented by 37th to 39th pixels counted from the left end rightward and 13th to 15th pixels counted from the upper end downward, and a position represented by 37th to 39th pixels counted from the left end rightward and 37th to 39th pixels counted from the upper end downward. These information dot positions are assumed by an information dot of a point dot that configures an information pattern corresponding to data to be embedded, as will be described hereinafter. Note that for the following description, as shown in FIG. 9, the information dot positions corresponding to the positions of the vertices of the square are indicated as positions a, b, c, d, respectively, as seen clockwise from the position of the lower left vertex of the square. Furthermore, the information dot positions corresponding to the positions each located at a center of a side of the square are indicated as positions e, f, g, h, respectively, as seen clockwise from the position of the center of the left side of the square.

The above described positioning and information dot positions are not limited to specific positions as shown in FIG. 9.

The positioning dot position may be any other position that can determine the position of a single area. The information dot position may also be any other position or include another position.

Furthermore, the point dot is also not limited geometrically to the aforementioned matrix of 3×3 pixels forming a rectangle (or square). Furthermore, the point dot is not limited geometrically to a "point".

FIG. 10 shows a specific example of an associative relationship between data to be embedded and identification information and an information pattern that storage unit 309 stores therein. If an area has an information dot position defined as shown in FIG. 9, storage unit 309 has an information pattern, i.e., an information dot position that is actually assumed by an information dot, stored therein for each of data to be embedded that is divided or identification information. In FIG. 10 an information pattern is configured of an 8-bit value defining whether an information dot is present/absent for each information dot position, i.e., positions a-h, such that "1" indicates that the dot is present and "0" indicates that the dot is absent. Furthermore, in the FIG. 10 example, the information dot positions or positions a-h have only three thereof to be assumed by an information dot, and 32 information patterns are defined. Furthermore, as a pattern different from the 32 information patterns, the particular pattern is also similarly defined.

In step S205 generation unit 307 refers to the associative relationship stored in storage unit 309 as shown in FIG. 10 to identify for each area an information pattern corresponding to data to be embedded (that has been divided) and identification information arranged. In step S207 it determines whether an information dot is present or absent for each of the information dot positions or positions a-h. That is, it determines to arrange an information dot or a point dot at an information dot position that is defined to be assumed by the information dot. Note that if an area of interest assumes a position of a particular pattern in a block, it determines to arrange a point dot at a position defined in FIG. 10 as a particular pattern.

Figure 11:
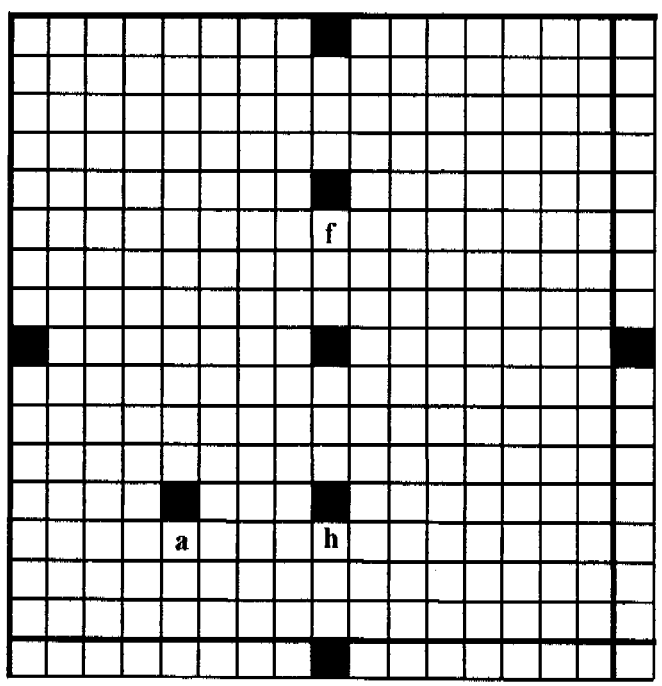
FIG. 11 shows as a specific example of an information pattern an information pattern corresponding to data to be embedded "10".

For example if data to be embedded that has been divided "10" is arranged in an area of interest, then generation unit 307 in step S205 refers to the FIG. 10 associative relationship to identify an information pattern, i.e., that, of the information dot positions or positions a-h, positions a, f, h are assumed by information dots, respectively, and the remaining positions are not assumed thereby. In step S207, generation unit 307 determines to arrange a point dot for positions a, f, h. Furthermore, it determines to arrange at a positioning dot position a point dot serving as a positioning dot. In other words, if in step S205 data to be embedded that has been divided "10" is arranged in an area of interest, an information pattern shown in FIG. 11 is determined and data to be embedded "10" is converted into watermarking data.

In steps S205 and S207 generation unit 307 performs this process for all areas to convert the data to be embedded that has been divided and identification information that are arranged as data to be embedded into watermarking data. If in step S103 the FIG. 7 data to be embedded is received, then watermarking data obtained through the S105 conversion represents a watermarking image shown in FIG. 12. Then in step S107 synthesis unit 311 synthesizes original image data and the watermarking data together and in step S109 an image is printed as shown in FIG. 13. In step S107 the watermarking data generated in step S105 is repeatedly arranged for the entirety of the size of a printing sheet of interest to synthesize the data with an original image.

Herein a printed matter of an image having embedded therein watermarking image data representing the FIG. 12 watermarking image obtained from the FIG. 7 data to be embedded (hereinafter referred to as data to be embedded 1), will be referred to as a print 1. Furthermore, a printed matter of an image having embedded therein watermarking image data obtained through a similar process for data to be embedded shown in FIG. 14 (hereinafter referred to as data to be embedded 2), will be referred to as a print 2.

Figure 15:
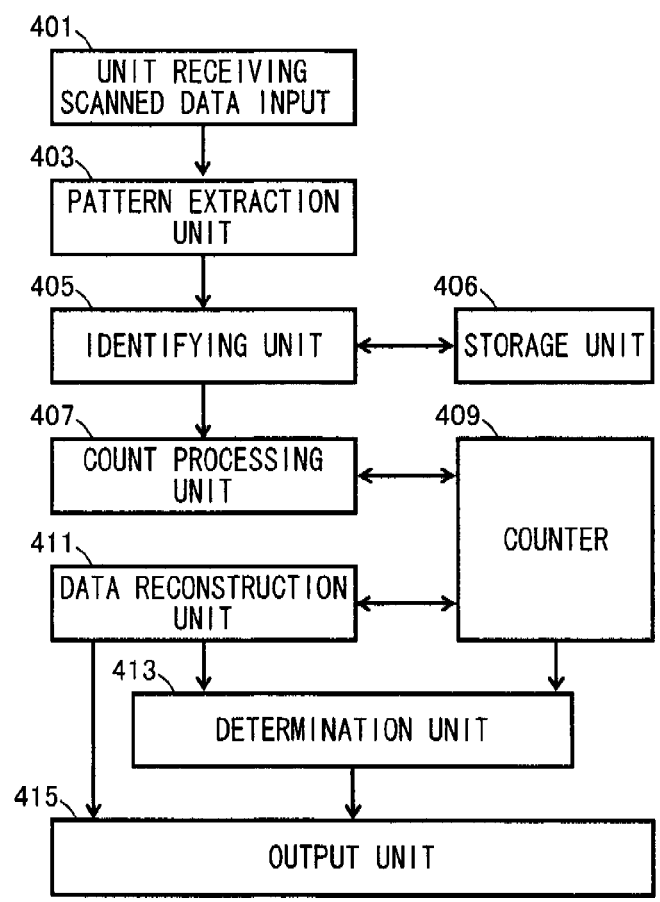
FIG. 15 is a block diagram showing a specific example of a configuration in function of a PC according to an embodiment.

FIG. 15 is a block diagram showing a specific example of a configuration in function of PC 1 that is the present detection apparatus in extracting and reconstructing embedded data from a printed image having the data embedded in an original image, as described above. Hereinafter, such printed image will also be referred to as a "woven pattern-added image". FIG. 15 shows functions, which are configured in CPU 101 mainly by CPU 101 executing the image processing software stored in storage device 102. Furthermore, they may be implemented by employing the FIG. 2 hardware configuration.

With reference to FIG. 15, PC 1's above functions include a unit 401 receiving scanned data input, a pattern extraction unit 403, an identifying unit 405, a storage unit 406, a count processing unit 407, a counter 409, a data reconstruction unit 411, a determination unit 413, and an output unit 415.

Unit 401 receiving scanned data input receives image data input through input/output I/F 100 as scanner 16 scans a woven pattern-added image. Unit 401 receiving scanned data input is connected to pattern extraction unit 403 to output the received image data to pattern extraction unit 403.

Pattern extraction unit 403 receives the image data and therefrom extracts a point dot. Pattern extraction unit 403 has previously stored a position assumed in an area by a positioning dot position, and extracts a positioning dot from extracted point dots and extracts an information pattern based thereon. Furthermore, pattern extraction unit 403 has a particular pattern previously stored, and identifies the particular pattern from extracted information patterns to identify a block. Furthermore, pattern extraction unit 403 has previously stored a positional relationship that each information pattern has with the particular pattern, i.e., a positional relationship of areas in a single block, and pattern extraction unit 403 determines an order of each information pattern extracted. Furthermore, pattern extraction unit 403 is connected to identifying unit 405 to output to identifying unit 405 information indicating an extracted information pattern and information indicating a position of an area in a block that has the information pattern embedded therein.

Storage unit 406 has stored therein such an associative relationship between data to be embedded and an information pattern as shown in FIG. 10, similarly as has been previously described for storage unit 309. Furthermore, identifying unit 405 is connected to storage unit 406 and count processing unit 407 to refers to the associative relationship that is stored in storage unit 406 in accordance with an information pattern received from pattern extraction unit 403 to identify embedded data (as divided) and identification information arranged for each area, and identifying unit 405 outputs them to count processing unit 407.

Counter 409 stores for image data to be processed the embedded data (as divided), identification information and the like identified by an information pattern for each area. Count processing unit 407 stores to counter 409 in accordance with the information received from identifying unit 405 the embedded data (as divided), identification information or other similar information arranged for each area. Data reconstruction unit 411 identifies for each area the embedded data (as divided) for which counter 409 has the highest count value, and in accordance with the positions of the areas in the block, data reconstruction unit 411 combines such data together to reconstruct the embedded data. Furthermore, data reconstruction unit 411 is connected to determination unit 413 and output unit 415 to output thereto the embedded data reconstructed and thus obtained.

Determination unit 413 is connected to data reconstruction unit 411, counter 409, and output unit 415 to compare identification information generated from embedded data that has been reconstructed in data reconstruction unit 411 in accordance with a count value with identification information stored in counter 409 to determine whether detection of embedded data has been done successfully, and determination unit 413 outputs the determination to output unit 415. Output unit 415 receives the reconstructed and thus obtained, embedded data from data reconstruction unit 411 and outputs it through input/output I/F 100 in accordance with the determination made by determination unit 413.

Figure 16:
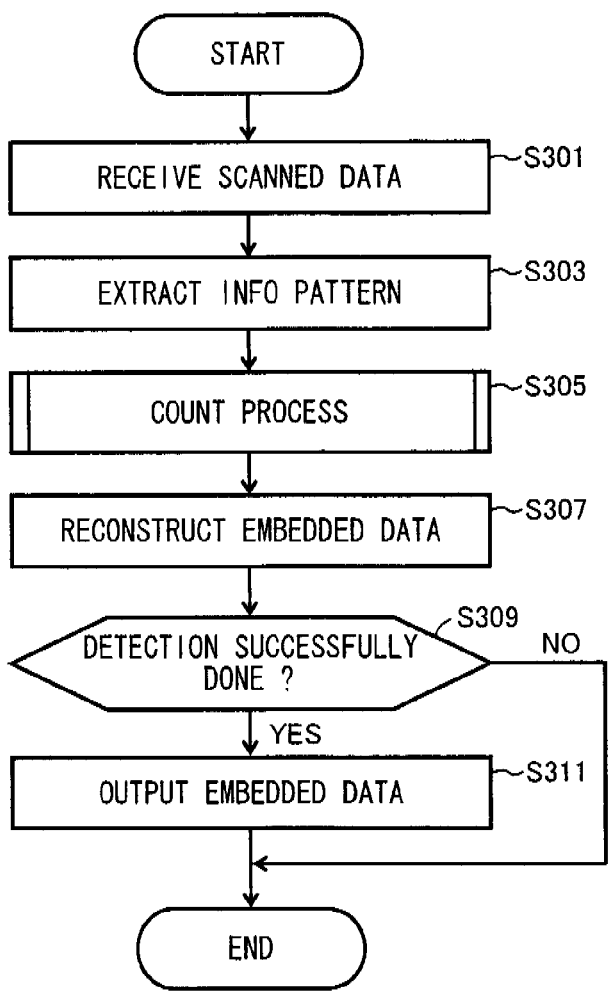
FIG. 16 is a flowchart of a specific example of a process performed in a PC according to an embodiment to extract and reconstruct embedded data from image data obtained from a scanned woven pattern-added image.

FIG. 16 is a flowchart of a specific example of a process performed in PC 1 to extract and reconstruct embedded data from image data obtained from a scanned woven pattern-added image. The FIG. 16 flowchart is implemented by CPU 101 executing the image processing software stored in storage device 102.

In the present embodiment, image data obtained by scanning two different woven pattern-added images that each have one type of data embedded therein and are placed on a platen of scanner 16 (not shown) adjacently is processed as an example of image data obtained by scanning a woven pattern-added image having a plurality of types of data embedded therein.

Figure 17:
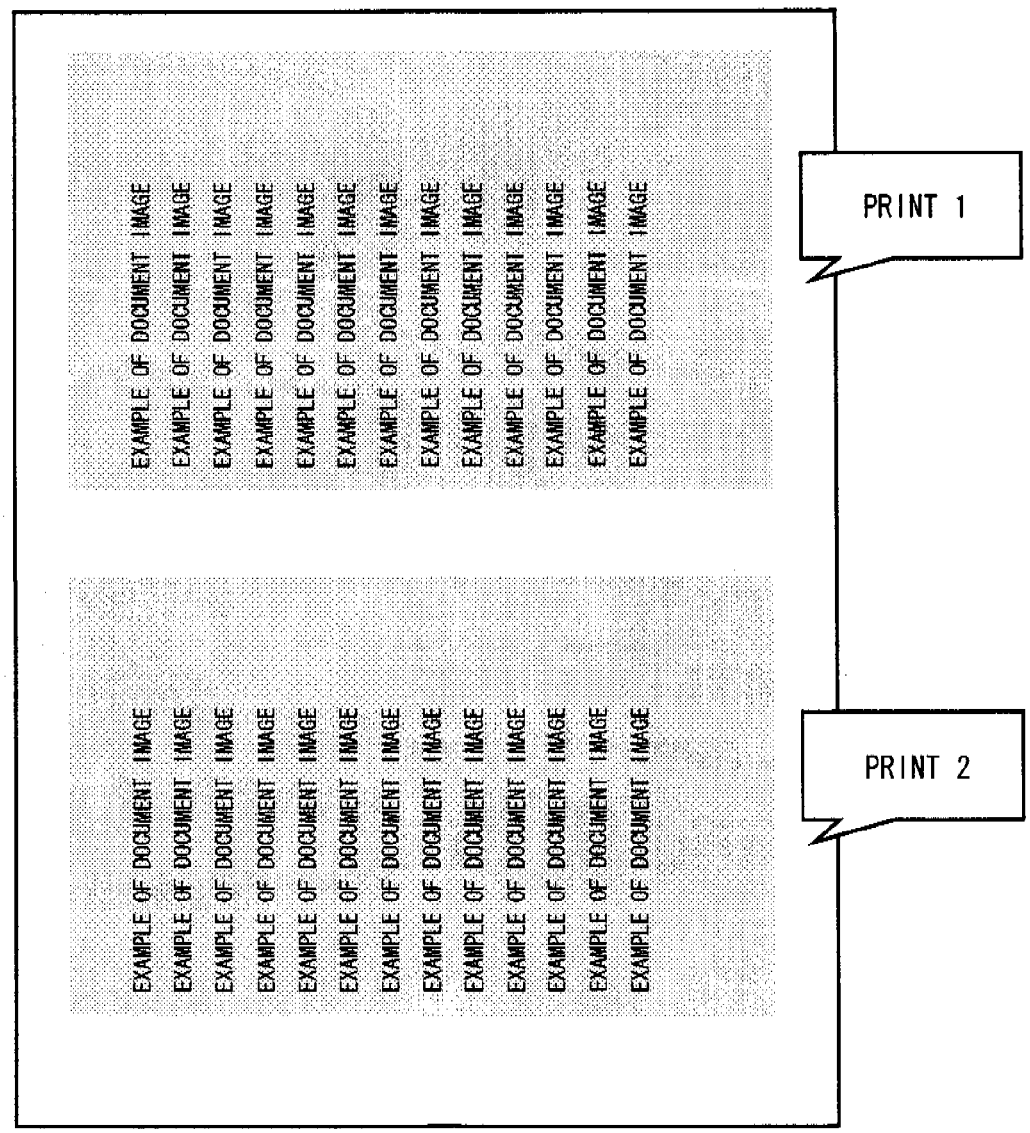
FIG. 17 shows a specific example of a scanned image.

With reference to FIG. 16, initially, the PC 1 unit 401 receiving scanned data input receives scanned data through input/output I/F 100 (step S301). The scanned data is image data obtained as scanner 16 scans the woven pattern-added images placed on the platen adjacently as shown in FIG. 17. If print 1 and print 2 are placed on the platen of scanner 16 (not shown) adjacently and thus scanned, scanner 16 obtains a scanned image as shown in FIG. 17, and in step S301 scanned data representing the FIG. 17 scanned image is received.

Figure 18:
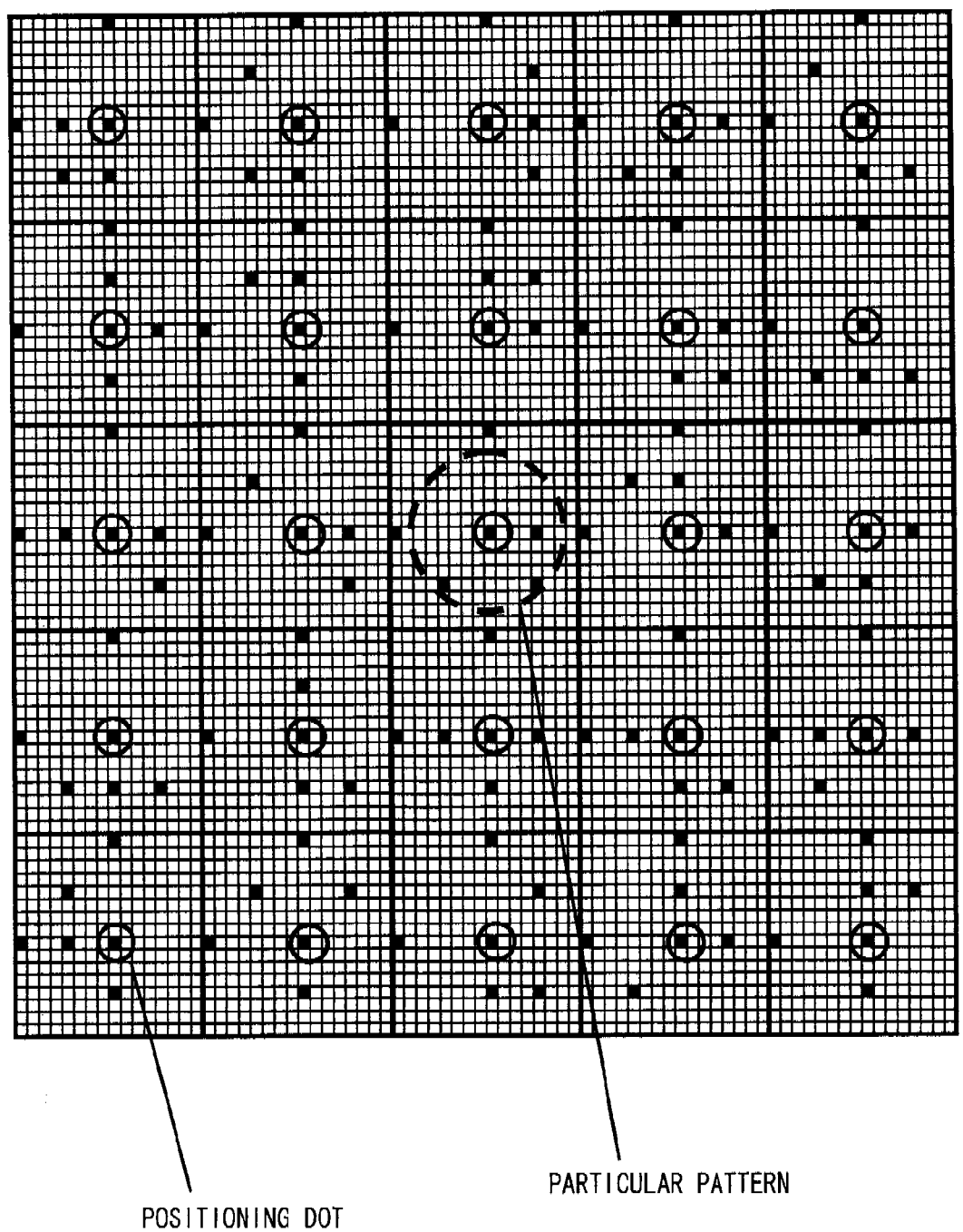
FIG. 18 shows as a specific example of a result of detection provided by a PC according to an embodiment a point dot detected from image data obtained by scanning a woven pattern-added image having embedded therein data represented by the FIG. 12 watermarking image.

Then, pattern extraction unit 403 extracts a point dot as shown in FIG. 18 from the scanned data received in step S301 to extract an information pattern (step S303). Herein the method of extracting the point dot is not limited to any particular method. However, as one specific example, the following method can be adopted. More specifically, as has been described previously, if a woven pattern-added image is printed at a resolution of 600 dpi with a point dot represented by a matrix of 3 by 3 pixels forming a rectangle (or a square), then it is assumed that scanner 16 scans at a resolution of 200 dpi. This represents the point dot in the scanned data by one row and one column of a pixel forming a rectangle (or a square). Accordingly when the FIG. 12 watermarking image is thus scanned a point dot is extracted from a portion of the FIG. 17 scanned image, as shown in FIG. 18.

If in step S301 image data is input with the original inclined, then in step S303 preferably the inclination is corrected. In the present invention the method of correcting the inclination is not limited to any particular method. However, as one specific example, a method that is described in a patent application filed by the present Inventor and published as US2006/0262957A1 can be adopted as will be described hereinafter. More specifically, the image data received in step S301 is processed by each of a plurality of filters detecting dots arranged in a woven pattern-added image equidistantly that correspond to a plurality of inclinations, respectively, to calculate an agreement, and that of the highest agreement is set as an angle of inclination and correction is done to allow the angle of inclination to be 0.

If in step S303 point dots are extracted from image data, as shown in FIG. 18, pattern extraction unit 403 detects therefrom a positioning dot of a center of an area, as shown in FIG. 18, (i.e., a circle indicated in FIG. 18 by solid line).

The method of detecting a positioning dot is also not limited in the present invention to any particular method. However, as one specific example, a method that is described in an earlier patent application filed by the present Inventor and published as US2006/0262957A1 can be adopted as will be described hereinafter. More specifically, a filter that previously defines a positioning dot position in an area can be used to detect a point dot of that position to detect a positioning dot and thus identify each area.

Pattern extraction unit 403 determines an information dot position from the positioning dot position of the center of each area and detects an information dot, and extracts an information pattern. When pattern extraction unit 403 detects the particular pattern in extracted information patterns, as indicated in FIG. 18 by a circle indicated by a dotted line, a determination is made that an area corresponding thereto is a block's center position, and a block defined by a matrix of 5 by 5 areas is identified.

Subsequently, identifying unit 405 and count processing unit 407 perform a count process with counter 409 for each block identified in step S303 (step S305). Herein in the present embodiment counter 409 is configured as will be described hereinafter. FIG. 19 represents counter 409 in a specific exemplary configuration. With reference to FIG. 19, in the present embodiment, counter 409 is configured including a region 501 used for classification including a region for storing identification information detected in an area, a region for storing how many times a count value is written to that counter, and a region for storing a flag indicating that the counter has at least one count value written therein, and a region 503 in the form of a histogram memory storing a count value corresponding to embedded data (as divided) identified by an information pattern extracted for each area. The FIG. 19 exemplary counter is a counter in an initial state before the step S305 count process, and has its regions all having a count value of an initial value of 0. Note that the counter's configuration is not limited to the FIG. 19 configuration and may be a different configuration. For example, the flag is used when whether region 501 has stored therein identification information that is data representing identification information (rather than an initial value) is determined. Accordingly, if another method can be used to make such determination, the flag may be dispensed with. More specifically, if identification information is assigned data other than an initial value ("0000000000" in the FIG. 19 example), the flag can be dispensed with.

Figure 20:
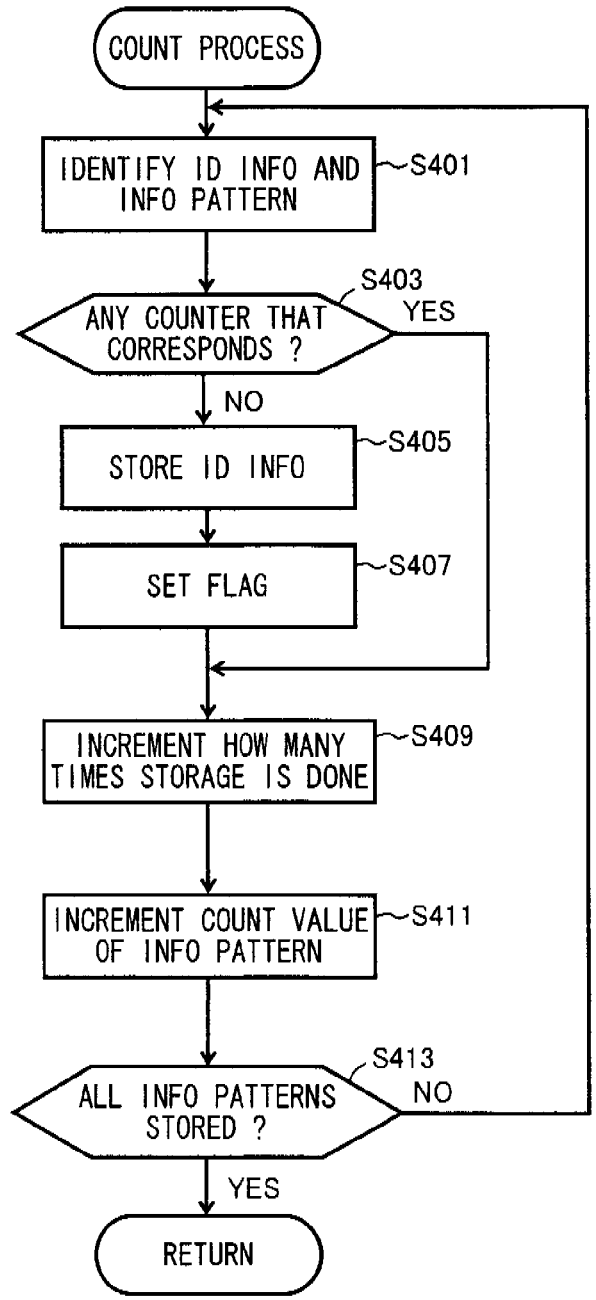
FIG. 20 is a flowchart of a count process in a specific example.

Specifically in step S305 a process shown in FIG. 20 is performed. With reference to FIG. 20, initially, identifying unit 405 receiving an information pattern extracted from a block identified in step S303 identifies therefrom identification information and an information pattern corresponding to embedded data (as divided) (step S401). With reference to a count value stored in the FIG. 19 counter, whether there is such a counter that region 501 has stored therein the identification information identified in step S401 and also has the flag set, is determined (step S403). If there is a corresponding counter in step S403, i.e., if there is a counter corresponding to the identification information identified in step S401 (YES at step S403), count processing unit 407 increments by one a count value indicated in the corresponding counter at region 501 and indicating how many times storage is done (step S409). Furthermore, a count value in region 503 that corresponds to (embedded data (as divided) corresponding to) the extracted information pattern is incremented by one (step S411).

If there is not a counter that has stored therein the identification information identified in step S401 and also has region 501 with the flag set (NO at step S403), i.e., if a block for which the identification information is identified undergoes the count process for the first time, count processing unit 407 stores the identification information that has been identified in step S401 in region 501 of the FIG. 19 counter having the initial state, and count processing unit 407 sets the flag in region 501 (steps S405, S407). Subsequently, steps S409 and S411 are performed.

Count processing unit 407 performs steps S401-S411 for all blocks (YES at step S413), and thus ends the count process.

The step S305 count process represented in FIG. 20 is thus performed for all blocks identified from scanned data input in step S301, and a count value of embedded data corresponding to an extracted information pattern is thus classified by identification information and stored in counter 409.

Figure 12:
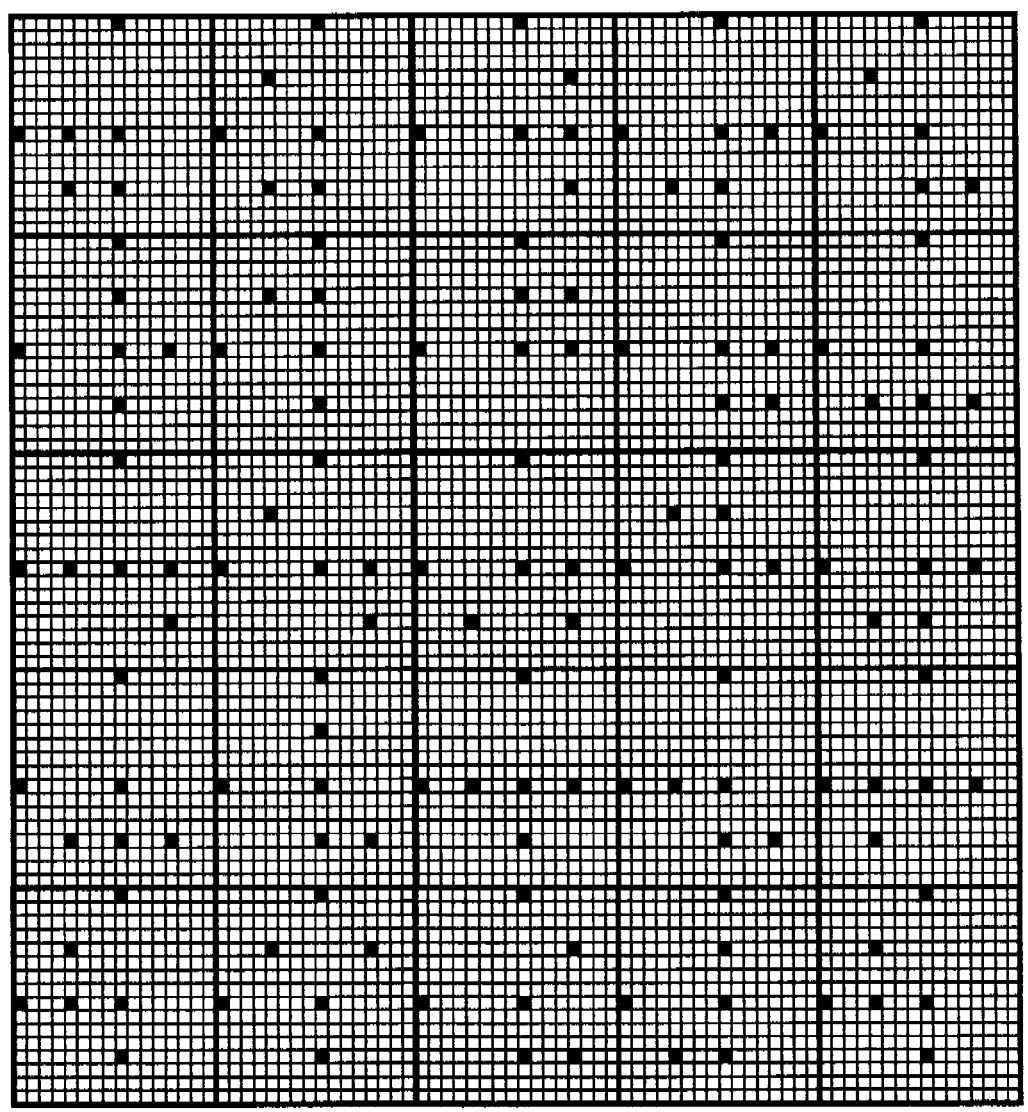
FIG. 12 shows as a specific example of a watermarking image a watermarking image obtained as the FIG. 7 data to be embedded is converted.
Figure 13:
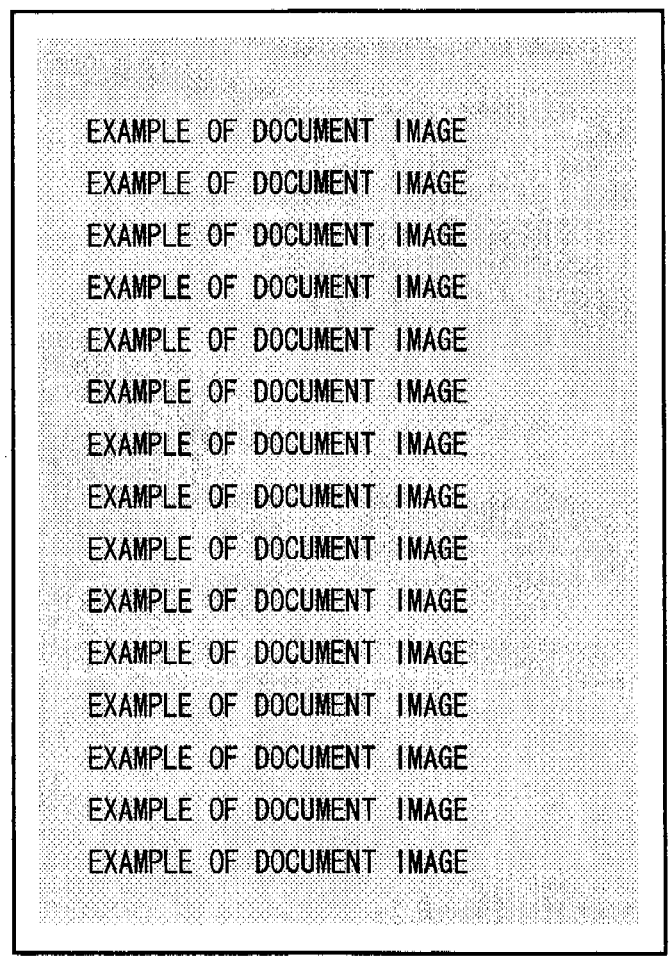
FIG. 13 shows a specific example of an image printed.

A block representing such a watermarking image as shown in FIG. 12 is repeatedly embedded in the entirety of a woven pattern-added image. For some original images, however, a dot in an original may for example overlap an information dot position and an arranged information dot may thus not be detected or a dot in an original may be detected as an information dot. In step S305, even for such a case, a count value of counter 409 that corresponds to an information dot extracted as based on a point dot detected from an information dot position for each area is incremented whenever the information dot is extracted. Accordingly, to exclude a result of extraction based on an information dot erroneously detected as has been described previously, after all blocks included in scanned data of interest are processed as described above, data reconstruction unit 411 identifies the embedded data that has the largest count value of counter 409 for each area as embedded data (as divided) embedded in that area, and in accordance with the defined areal positional relationship, data reconstruction unit 411 combines for each block the embedded data that have such largest count values together in their order to reconstruct embedded data for the block (step S307). For example, all blocks included in scanned data representing the FIG. 17 scanned image are processed as described above and thereafter if a first counter provides values as shown in FIG. 21 and a second counter provides values as shown in FIG. 22, they indicate that the first counter counts (see FIG. 21) that for the area "third pattern" i.e., an area, as seen in FIG. 8, located in the uppermost row and the third column as counted in the figure from the left end, data 2 is detected twice and data 30 is detected 9,863 times. In that case, data 30 has the largest count value, as indicated in FIG. 21 by an oval, and in step S307 data reconstruction unit 411 determines that the embedded data arranged in that block at that area is data 30. Similarly, data reconstruction unit 411 determines for the first counter's count values (FIG. 21) that the area "fourth pattern" i.e., the area located in the uppermost row and the fourth column from the left end, has embedded data of data 5 arranged therein, and data reconstruction unit 411 determines for the second counter's count values (FIG. 22) that the area "second pattern" i.e., the area located in the uppermost row and the second column from the left end, has embedded data of data 0 arranged therein.

By the above process, embedded data 1 embedded in print 1 and embedded data 2 embedded in print 2 are extracted from scanned data obtained from a scanned woven pattern-added image. While embedded data reconstructed may be output after step S307 (step S311), preferably, determination unit 413 determines whether the step S307 detection of embedded data has been done successfully (step S309), and the data is output in accordance with the determination.

More specifically in step S309 determination unit 413 uses embedded data (as divided) that is detected in step S307 to perform a processing operation generating identification information, compares a value obtained from the processing operation with identification information stored in a counter at region 501, and from whether they match, determines whether the detection has been done successfully. The processing operation as performed herein is similar to that performed in processing unit 304, i.e., that generating identification information in embedding data to be embedded, when PC 1 functions as an image formation apparatus embedding data to be embedded in an original image. If they match, determination unit 413 determines that the step S307 detection has been done successfully. If they do not match, determination unit 413 determines that the step S307 detection has been done unsuccessfully. Furthermore, whether the detection has been done successfully is alternatively determined by referring to a counter at region 501 to see how many times a count value has been written, and determining that the detection has been done unsuccessfully if the count value has been written at most a predetermined number of times. For example if a noise on a scanned image, an effect of an original image or the like prevents identification information from being detected accurately and identification information different from that of data embedded is read, a possibility of detecting identical identification information more than once would be rather low. As such, determining that the detection has been done unsuccessfully for a value written at most the predetermined number of times (e.g., at most once) allows a count value associated with erroneously detected identification information to be excluded from consideration.

If a determination is made that the step S307 detection has been done successfully (YES at step S309) output unit 415 outputs embedded data (step S311). If a determination is made that the step S307 detection has been done unsuccessfully (NO at step S309) output unit 415 can avoid outputting embedded data. Furthermore, if the determination is made that the detection has been done unsuccessfully, an indication of an error may be displayed or the process may again be performed.

PC 1 in the present embodiment that performs a process to reconstruct embedded data, as described above, allows a plurality of types of embedded data to be detected from scanned data having the plurality of types of data embedded therein, and can thus provide improved performance for detection. Furthermore, it can also consider how many times the detection is done to prevent erroneous detection from contributing to reconstructing embedded data and thus provide detection with improved precision.

First Exemplary Variation

In the above specific example a process performed up to step S305 is performed for all blocks included in scanned data received in step S301 and thereafter in step S307 embedded data is reconstructed. Alternatively, steps S303 and S305 may be performed in the vertical scanning direction for each predetermined number of pixels and in step S307 embedded data may be reconstructed.

Figure 23:
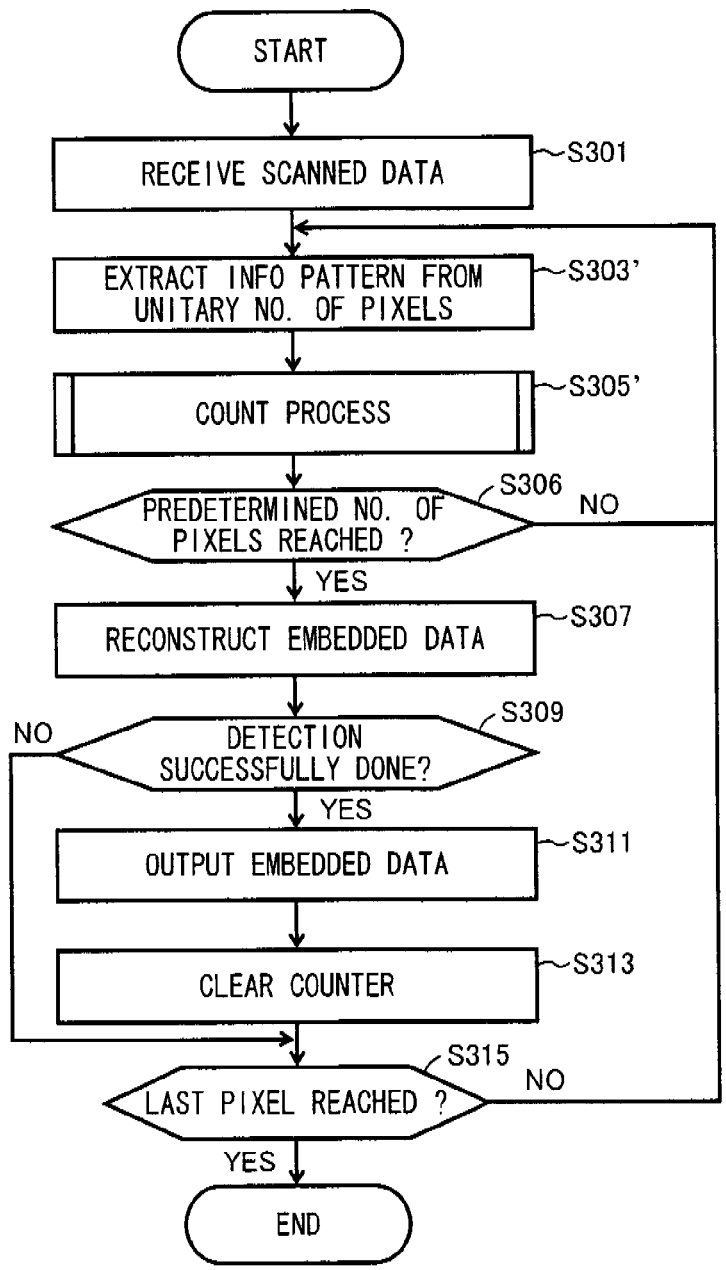
FIG. 23 is a flowchart of a process in a first exemplary variation performed to extract and reconstruct embedded data.
Figure 24:
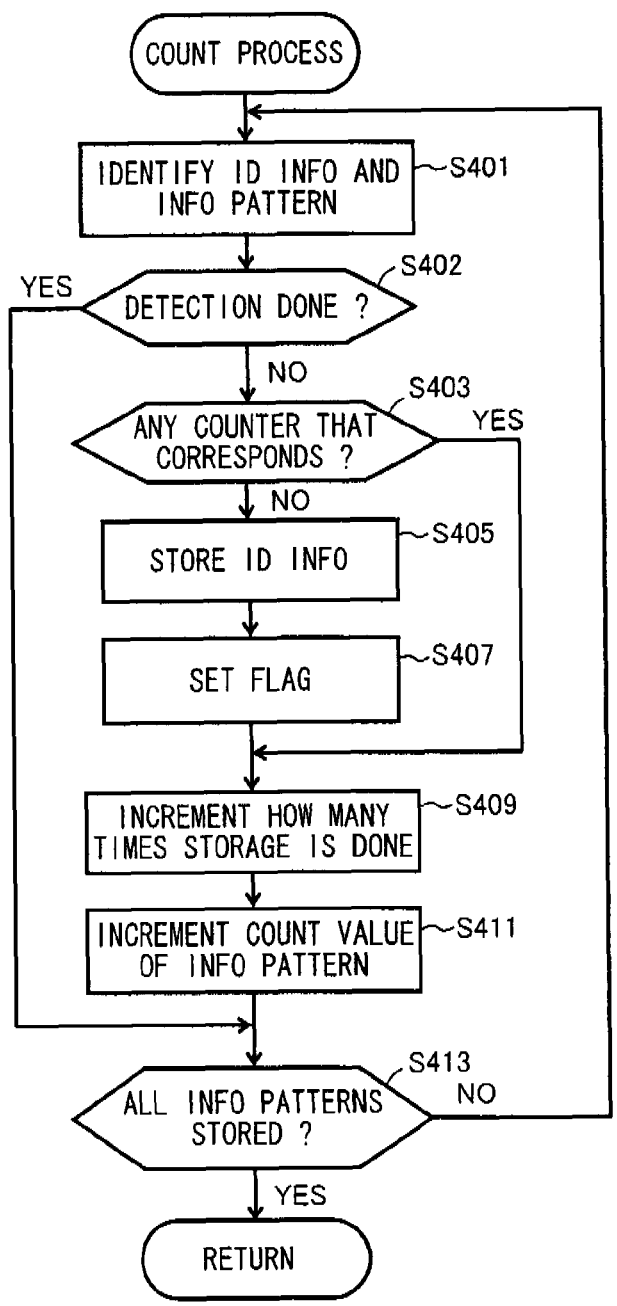
FIG. 24 is a flowchart of a count process in the first exemplary variation.

In the first exemplary variation, embedded data is extracted and reconstructed through a process, as shown in FIG. 23 in a flowchart, and a count process is performed, as shown in FIG. 24 in a flowchart. The FIGS. 23 and 24 flowcharts correspond to the FIG. 16 and FIG. 20 flowcharts, respectively, with different steps denoted by different step numbers.

With reference to FIG. 23, in step S301, scanned data is similarly received. In first exemplary variation, pattern extraction unit 403 extracts a point dot from scanned data that is received in step S301 for a unitary number of pixels predefined in the vertical scanning direction, and extracts an information pattern (step S303'). This is done in a method similar to that in step S303. Identifying unit 405 and count processing unit 407 perform a count process (step S305'). Count processing unit 407 determines whether steps S303' and S305' have been performed for a predetermined number of pixels in the vertical scanning direction (step S306), and until the predetermined number of pixels is reached, steps S303' and S305' are repeated. If a determination is made that the predetermined number of pixels has been reached (YES at step S306), then at that temporal point data reconstruction unit 411 reconstructs embedded data (step S307). Determination unit 413 determines whether the step S307 detection has been done successfully (step S309), and if the step S307 detection has been done successfully when the predetermined number of pixels have been processed (YES at step S309), then output unit 415 outputs embedded data (step S311). Furthermore, count processing unit 407 clears counter 409's count value (step S313). Furthermore, count processing unit 407 stores information (e.g., identification information) identifying embedded data for which the detection has been done successfully. If the step S307 detection has been done unsuccessfully when the predetermined number of pixels have been processed (NO at step S309), steps S311 and S313 are not performed.

Steps S303'-S313 are repeated until they reach the last pixel of the scanned data received in step S301, as seen in the vertical scanning direction, and when the last pixel is reached (YES at step S315), the process ends.

The step S305' count process is performed, as follows, with reference to FIG. 24. In step S401 identification information is identified from an information pattern extracted from a block identified in step S303', and count processing unit 407 refers to information stored in step S313 and identifying embedded data for which the detection has been done successfully, and determines therefrom whether embedded data identified by the identification information identified in step S401 has already been detected (step S402). If so (YES at step S403), step S403 et seq. previously described are skipped, otherwise (NO at step S402), step S403 et seq. are performed. In other words, in the first exemplary variation, embedded data having been detected in a previously performed detection process is not subjected to the count process and only embedded data that is undetected is subjected thereto.

PC 1 performing a process according to the first exemplary variation allows embedded data to be efficiently extracted and reconstructed from scanned data in such a case as described below. Note that herein the predetermined number of pixels aforementioned is specifically assumed to be 1,000 pixels. The predetermined number of pixels may be preset for count processing unit 407 or may be input or varied through a predetermined operation. Furthermore, the specific number of pixels is not limited to 1,000 pixels and may be a statistical element count obtained from a bit count.

For example in step S301 scanned data representing a scanned image similar to that shown in FIG. 17 is received specifically for the sake of illustration. More specifically, with reference to FIG. 25, print 1 and print 2 placed adjacently in the vertical scanning direction are scanned and data is thus received therefrom for the sake of illustration. A scanned image obtained up to 1,000 pixels in the vertical scanning direction has embedded therein embedded data 1 embedded in print 1. Accordingly, when 1,000 pixels are reached in step S306 for the first time, then subsequently in step S307 there is a large possibility that embedded data 1 is detected. Furthermore, if for example an original's content, an upper margin and/or the like affect(s) and embedded data is unsuccessfully detected, embedded data 1 would be detected when 1,000 pixels are reached for a second time, at latest for a third time. When this is compared with reconstructing embedded data after a process up to step S305 is performed for all of the blocks included in scanned data, as previously described, the former allows a first type of data to be reconstructed to be reconstructed at a stage earlier than the latter does. Furthermore, if embedded data 1 is detected when 1,000 pixels are reached for the first time or a second time, and if identification information indicating embedded data 1 is identified in a subsequent process, then counter 409 is cleared. This allows counter 409 to be allotted a reduced storage capacity. This is more suitable when counter 409 is implemented in hardware. Furthermore, in that case, a subsequent process is performed without a detection process for embedded data 1. This allows a faster process for software processing.

In the step S305' count process a noise on a scanned image, an effect of an original image or the like may prevent identification information from being detected accurately, and, as shown in FIG. 26, a count value may be stored in counter 409 for identification information different from that of embedded data 1. In step S313, preferably, a counter corresponding to embedded data (embedded data 1) reconstructed in step S307 is cleared, and, as shown in FIG. 26, a counter with an input done at most a predetermined number of times is also cleared. In the first exemplary variation, the count process is performed for each predetermined number of pixels (1,000 pixels herein), and if identification information different from that of embedded data 1 is erroneously read, a possibility of reading the same, erroneous identification information would be low. Accordingly, as the predetermined number, one is included. This allows counter 409 to be allotted a further reduced storage capacity.

Second Exemplary Variation

Figure 27:
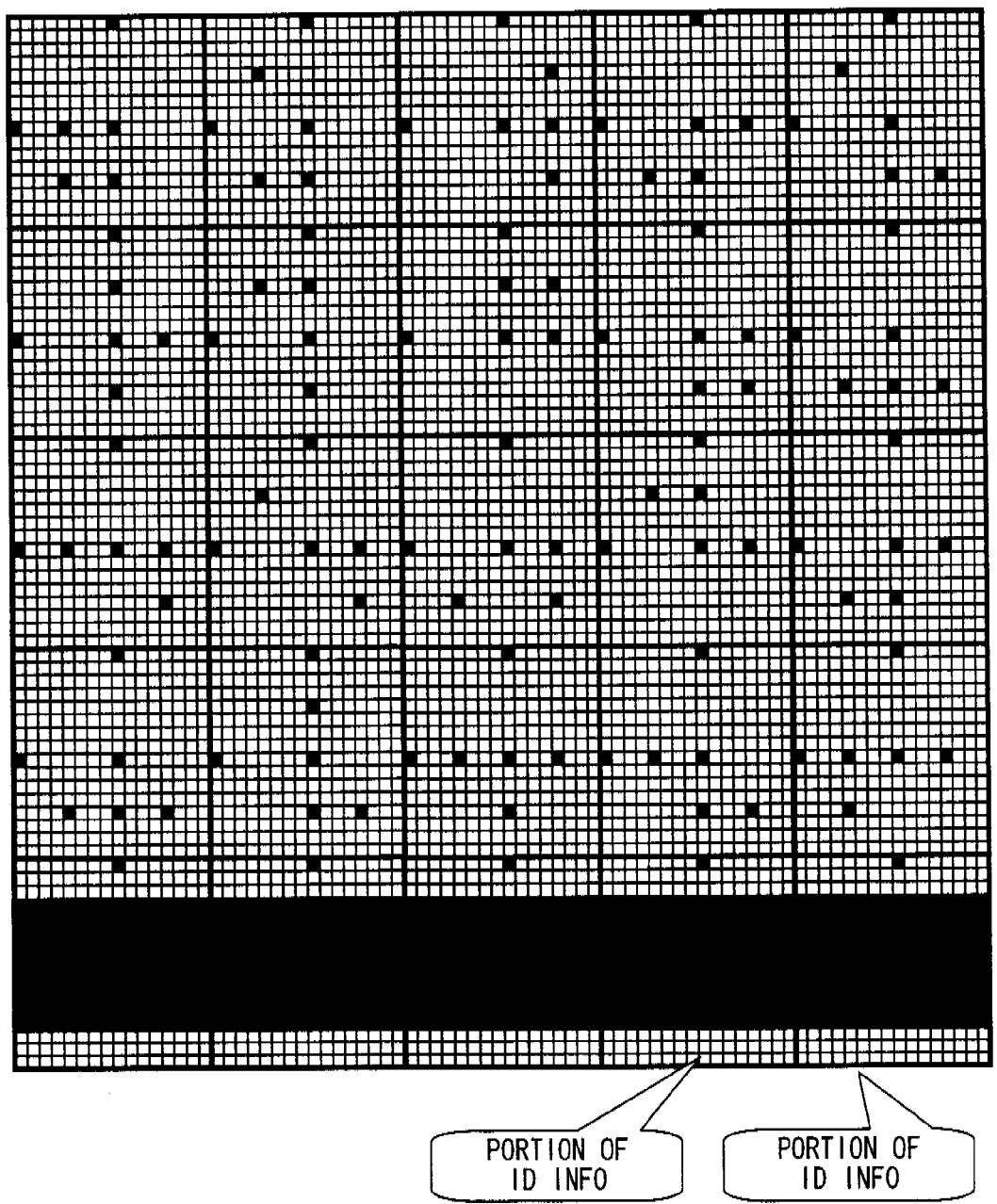
FIG. 27 shows scanned data in a specific example.

In the present embodiment identification information is assigned for a block in an area of the block that is defined in the block at the bottommost row and the first and second rightmost columns. However, a noise on a scanned image, an effect of an original image or the like may prevent an information pattern from being identified from an area assigned identification information, as shown in FIG. 27 for example. In the above described process if identification information is not identified in step S401 a following process cannot be performed and it is thus assumed that the count process is not performed for that block (even if an information pattern is identified in another area). However, for a case as shown in FIG. 27, an information pattern identified in another area may be used to perform the count process.

The second exemplary variation provides counter 409 including a counter of a first configuration shown in FIG. 19 and in addition thereto a counter of a second configuration shown in FIG. 28. With reference to FIG. 28, the counter of the second configuration is configured including a region 503' similar to region 503 of the counter of the first configuration, as has been previously described, and in the form of a histogram memory storing a count value corresponding to embedded data (as divided) identified by an extracted information pattern, and a region 505 in the form of a histogram memory storing a count value corresponding to identification information identified by the extracted information pattern. More specifically, the second configuration does not include region 501 described previously, i.e., a region for classification including a region for storing identification information detected in an area, a region for storing how many times a count value is written to that counter, and a region for storing a flag indicating that the counter has at least one count value written therein. Thus the counter of the second configuration can be used to store a count value without providing classification for each block in accordance with identification information.

Figure 31:
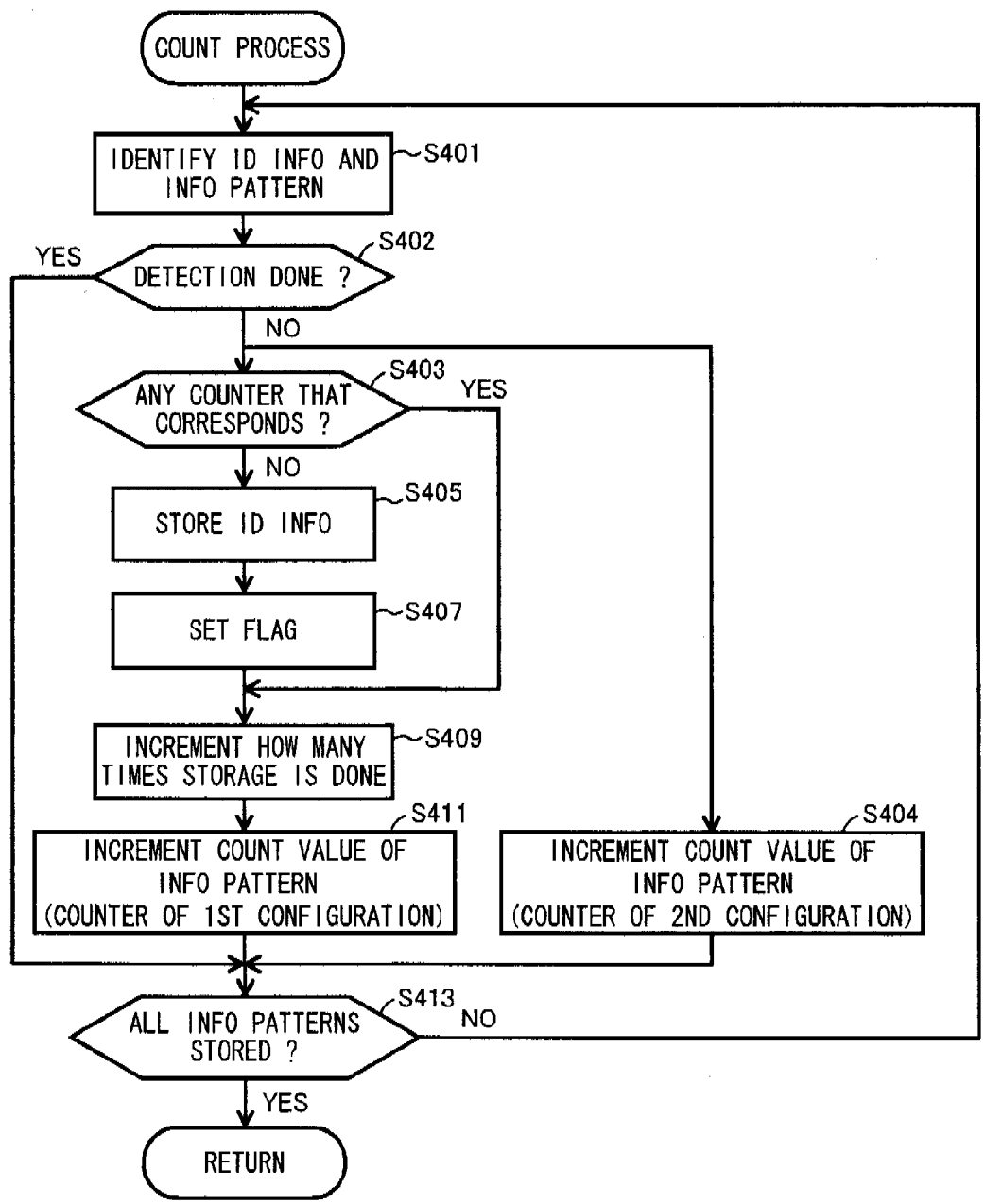
FIG. 31 is a flowchart of a count process in a second exemplary variation.

In the second exemplary variation, as well as the first exemplary variation, it is assumed that the count process is performed for each predetermined number of pixels in the vertical scanning direction. Furthermore, a process in the second exemplary variation for extracting and reconstructing embedded data can be explained with reference to the FIG. 23 flowchart representing a process according to the first exemplary variation. With reference again to FIG. 23, in step S301, scanned data is similarly received. The second exemplary variation also has pattern extraction unit 403 extracting a point dot from scanned data that is received in step S301 at a unitary number of pixels predefined in the vertical scanning direction, and extracting an information pattern (step S303'). Identifying unit 405 and count processing unit 407 perform a count process (step S305'). In the second exemplary variation the count process is performed, as described hereinafter with reference to FIG. 31. With reference to FIG. 31, count processing unit 407 performs steps S403-S411, as described above, for the counter of the first configuration, similarly as done in the first exemplary variation. In the second exemplary variation, in addition to the above process, a count value corresponding to embedded data (as divided) identified by an information pattern extracted from a block identified in step S303' is incremented for the counter of the second configuration and stored in region 503 of the counter of the second configuration included in counter 409. Furthermore, if an information pattern is extracted from an area of a block identified in step S303 that has identification information arranged therein, a counter corresponding to data (identification information) identified from that information pattern is incremented and stored in region 505 of counter of the second configuration included in counter 409 (step S404). Steps S303' and S305' are repeated until they reach the predetermined number of pixels in the vertical scanning direction When the predetermined number of pixels is reached (YES at step S306), then at that temporal point data reconstruction unit 411 reconstructs embedded data based on a count value stored in the counter of the second configuration at region 503 (step S307). Furthermore in step S309 determination unit 413 determines whether the step S307 detection has been done successfully. In the second exemplary variation a count value corresponding to identification information identified by an information pattern extracted from the above indicated predetermined number of pixels is stored in the counter of the second configuration at region 505. Accordingly, determination unit 413 identifies data that has the largest count value as identification information, similarly as done when data reconstruction unit 411 reconstructs embedded data. Furthermore, determination unit 413 performs a processing operation using embedded data (as divided) detected in step S307 to generate identification information, compares a value obtained from the processing operation with identification information identified from a count value stored in a counter at region 505, and in accordance with whether they match, determines whether the detection has been done successfully. The processing operation as performed herein is similar to that performed in processing unit 304, i.e., that generating identification information in embedding data to be embedded, when PC 1 functions as an image formation apparatus embedding data to be embedded in an original image. If they match, determination unit 413 determines that the step S307 detection has been done successfully. If they do not match, determination unit 413 determines that the step S307 detection has been done unsuccessfully.

Figure 25:
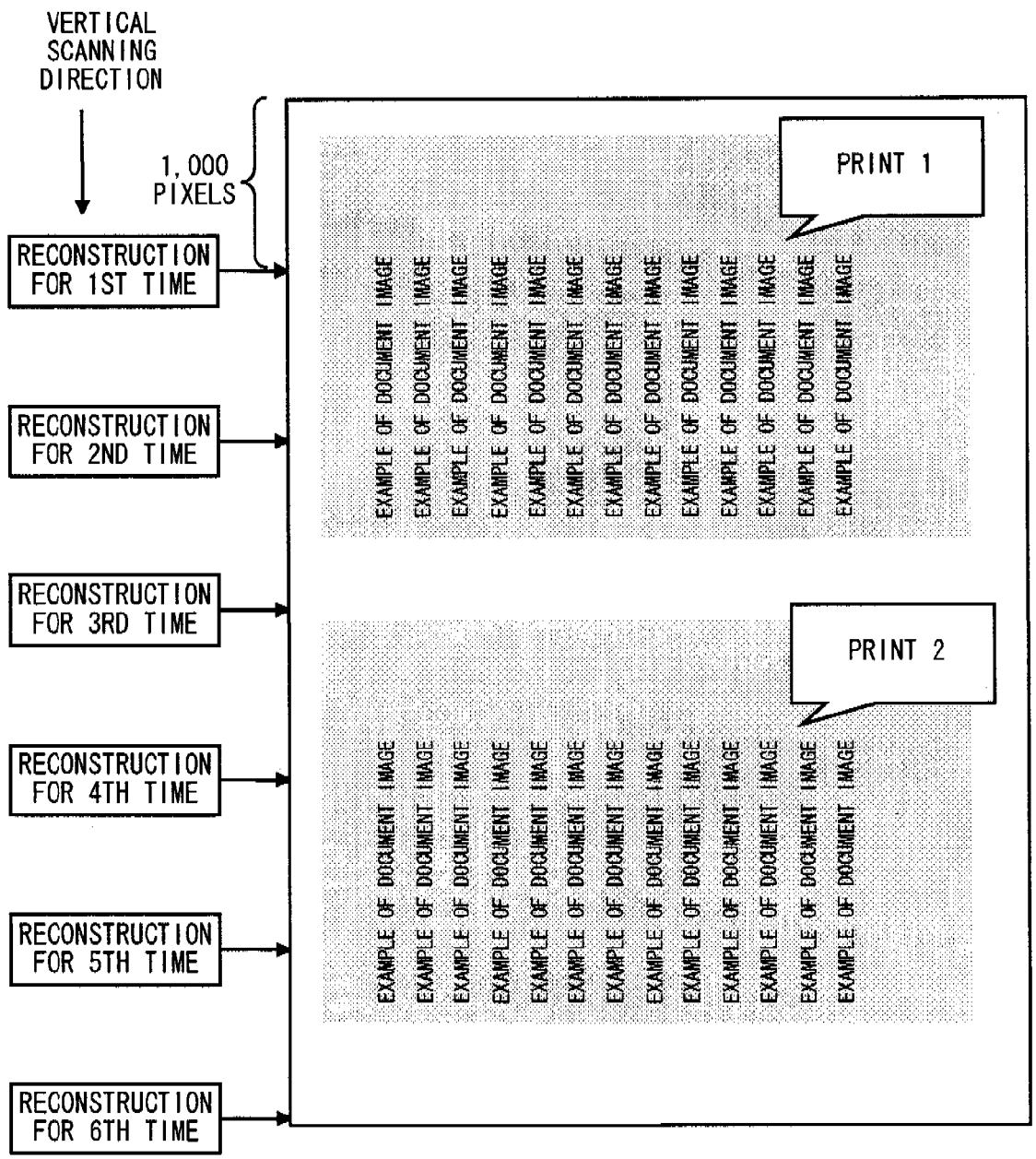
FIG. 25 shows scanned data in a specific example.

PC 1 thus performing a process according to the second exemplary variation allows embedded data to be reconstructed by identifying an information pattern from an area if an information pattern cannot be identified in an area having identification information arranged therein, as shown in FIG. 27. Embedded data can thus be efficiently extracted and reconstructed from scanned data. In particular, as shown in FIG. 25, if print 1 and print 2 placed adjacently in the vertical scanning direction are scanned and data is thus received therefrom, a scanned image obtained up to 1,000 pixels in the vertical scanning direction has embedded therein only embedded data 1 embedded in print 1. As such, if a counter is not configured to provide classification for each identification information and thus store a count value, as described in the second exemplary variation, it never has count values of a plurality of types of embedded data mixed up. In other words, the count process in the second exemplary variation is effective for scanned data having a plurality of types of embedded data embedded therein separately in the vertical scanning direction, as shown in FIG. 25, rather than having such data mixed up and thus embedded therein.

Note that in the second exemplary variation, if identification information is identified in a block of interest, then, in the count process, classification may provided for each identification information and a count value may be stored to a counter of the first configuration, and if identification information is not identified, then such classification may be avoided and a count value may be stored to a counter of the second configuration. In that case, if embedded data is identified by the count value stored in the first counter, that data may preferentially be used to reconstruct the embedded data. Furthermore, if identification information is identified from a count value stored in the second counter at region 505 it may be compared with identification information stored in the first counter at region 501, and if they match, a count value of any of the counters may be used to reconstruct embedded data.

Note that it is also preferable in the second exemplary variation, as well as in the first exemplary variation, that if a determination is made in step S309 that the detection has been done successfully for one type of embedded data, count processing unit 407 clears count values of both of the counters of the first and second configurations of counter 409.

Furthermore in the above described specific example counter 409 has been described to include a counter of a first configuration, or a counter of the first configuration and a counter of a second configuration. However in the present detection apparatus the counter is not limited in configuration to the above described configuration. For example, as another specific example, as shown in FIG. 29, a count value that is classified for each identification information and a count value that is not thus classified may be stored for each area. Furthermore, as still another specific example, rather than a count value corresponding to embedded data (as divided) identified by an extracted information pattern, a count value of a dot count of each of information dot positions or positions a-h, as previously described, may be stored, as shown in FIG. 30. Alternatively, the counter may have other configurations. If the counter has a configuration different from that previously described, the count process, the process for determining whether the detection has been done successfully, and the like have their contents adapted in accordance with the counter's configuration.

Note that in the above specific example PC 1 or MFP 2 performs a process for embedding data to be embedded in an original image as a watermarking image, and a process for extracting and reconstructing embedded data from image data obtained from a scanned woven pattern-added image. However, the two processes may be done in different apparatuses, respectively.

Furthermore, a program can also be provided that causes a computer to perform the process for embedding data to be embedded in an original image as a watermarking image, and the process for extracting and reconstructing embedded data from image data obtained from a scanned woven pattern-added image. Such a program can also be stored in a flexible disc, compact disk-read only memory, (CD-ROM), read only memory (ROM), random access memory (RAM), a memory card and/or a similar computer readable storage medium accompanying the computer, and can be provided as a program product. Alternatively, it can be stored and provided in a storage medium such as a hard disc incorporated in the computer. Furthermore, it can also be downloaded through a network and thus provided.

Note that the program may be a program allowing a necessary one of program modules that are provided as part of an operating system (OS) of the computer, a printer driver and the like to be invoked in a predetermined sequence, as timed as predetermined, to cause a process to be performed. In that case, the program per se does not include the module, and cooperates with the OS, the printer driver and the like to perform the process.

Furthermore the program may be incorporated in a portion of another program and thus provided. The program in that case also does not include the module included in the other program, and the former program cooperates with the latter program to perform a process.

The program product provided is installed in a hard disc or a similar program storage unit and executed. Note that the program product includes the program per se and a storage medium having the program stored therein.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of detecting embedded data embedded in a plurality of blocks of image data, said embedded data including identification information unique to said embedded data, and said embedded data being divided into a plurality of divided data each corresponding to one of a plurality of data values, each of said plurality of divided data being respectively embedded into one of a plurality of areas, each of said areas being arranged into a block in a predetermined pattern, the method comprising:

the step of identifying each one of said blocks of said image data;

the step of detecting said identification information in said blocks;

the step of extracting said divided data from each of said blocks;

for each area of the predetermined pattern, the step of counting the number of extractions of each of the plurality of data values among the plurality of said blocks; and the step of reconstructing embedded data that is identified by said identification information based on the counted number of extractions;
wherein the counting the number of extraction of each of the plurality of data values among the plurality of said blocks is performed for each identification information.

2. The method according to claim 1, further comprising the second step of counting, regardless of said identification information, the number of extractions of said divided data extracted in the step of extracting.

3. The method according to claim 1, further comprising the third step of counting the number of extractions of said divided data extracted in the step of extracting, if said identification information is not detected in the step of detecting.

4. The method according to claim 1, wherein said identification information is calculated from said embedded data.

5. The method according to claim 1, wherein the step of reconstructing is performed for each predetermined range of said image data.

6. The method according to claim 5, further comprising the step of determining whether said embedded data has been reconstructed successfully in the step of reconstructing.

7. The method according to claim 6, further comprising the step of outputting said embedded data reconstructed, if in the step of determining, a determination is made that said embedded data has been reconstructed successfully.

8. The method according to claim 6, further comprising the step of clearing the count value counted in the step of counting for each identification information which corresponds to said identification information of said embedded data reconstructed successfully, if in the step of determining, a determination is made that said embedded data has been reconstructed successfully.

9. The method according to claim 6, wherein if in the step of determining, a determination is made that said embedded data has been reconstructed successfully, then thereafter the step of counting for each identification information is not performed for said identification information of said embedded data successfully reconstructed.

10. The method according to claim 1, wherein the number of extractions of said divided data is counted with respect to each said data value.

11. The method according to claim 1, wherein the number of extractions of said divided data is counted with respect to each dot position which is used for representing said data value.

12. A detection apparatus for detecting embedded data embedded in a plurality of blocks of image data, said embedded data including identification information unique to said embedded data, and said embedded data being divided into a plurality of divided data each corresponding to one of a plurality of data values, each of said plurality of divided data being respectively embedded into one of a plurality of areas, each of said areas being arranged into a block in a predetermined pattern, the detection apparatus comprising:
an identifying unit which is adapted to identify each one of said blocks of said image data;
a detection unit which is adapted to detect said identification information in said blocks;
an extraction unit which is adapted to extract said divided data from each of said blocks;
a first counter which is adapted to, for each area of the predetermined pattern, count the number of extractions of each of the plurality of data values among the plurality of said blocks; and
a reconstruction unit which is adapted to reconstruct embedded data that is identified by said identification information based on the number of extractions counted by said first counter;
wherein the counting the number of extraction of each of the plurality of data values among the plurality of said blocks is performed for each identification information.

13. The detection apparatus according to claim 12, further comprising a second counter which is adapted to count, regardless of said identification information, the number of extractions of said divided data extracted by said extraction unit.

14. The detection apparatus according to claim 12, further comprising a third counter which is adapted to count the number of extractions of said divided data extracted by said extraction unit, if said identification information is not detected by said detection unit.

15. The detection apparatus according to claim 12, wherein said identification information is information calculated from said embedded data.

16. The detection apparatus according to claim 12, wherein said reconstruction unit attempts to reconstruct said embedded data for each predetermined range of said image data.

17. The detection apparatus according to claim 16, further comprising a determination unit which is adapted to determine whether said reconstruction unit has successfully reconstructed said embedded data.

18. The detection apparatus according to claim 17, further comprising an output unit which is adapted to output said embedded data reconstructed, if said determination unit determines that said embedded data has been reconstructed successfully.

19. The detection apparatus according to claim 17, wherein if said determination unit determines that said embedded data has been reconstructed successfully, said first counter clears said count value corresponding to said identification information of said embedded data successfully reconstructed.

20. The detection apparatus according to claim 17, wherein if said determination unit determines that said embedded data has been reconstructed successfully, then thereafter said first counter does not perform counting corresponding to said identification information of said embedded data successfully reconstructed.

21. The detection apparatus according to claim 12, wherein said first counter counts the number of extractions of said divided data with respect to each said data value.

22. The detection apparatus according to claim 12, wherein said first counter counts the number of extractions of said divided data with respect to each dot position which is used for representing said data value.

* * * * *